US012769505B2

(12) United States Patent
Koppens

(10) Patent No.: US 12,769,505 B2
(45) Date of Patent: *Oct. 20, 2026

(54) BITSTREAM REPRESENTING AUDIO IN AN ENVIRONMENT

(71) Applicant: KONINKLIJKE PHILIPS N.V., Eindhoven (NL)

(72) Inventor: Jeroen Gerardus Henricus Koppens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 26 days.

This patent is subject to a terminal disclaimer.

(21) Appl. No.: 18/636,350

(22) Filed: Apr. 16, 2024

(65) Prior Publication Data

US 2024/0267693 A1 Aug. 8, 2024

Related U.S. Application Data

(63) Continuation of application No. 18/701,635, filed as application No. PCT/EP2022/079285 on Oct. 20, 2022.

(30) Foreign Application Priority Data

Oct. 26, 2021 (EP) .................................... 21204639

(51) Int. Cl.
*G06F 3/16* (2006.01)
*G10L 19/008* (2013.01)
(Continued)

(52) U.S. Cl.
CPC .............. *G06F 3/165* (2013.01); *G06F 3/167* (2013.01); *G10L 19/008* (2013.01); *H04S 3/008* (2013.01);
(Continued)

(58) Field of Classification Search
None
See application file for complete search history.

(56) References Cited

U.S. PATENT DOCUMENTS 10,339,947 B2 7/2019 Johnston
10,453,463 B2 10/2019 Baumgarte
(Continued)

FOREIGN PATENT DOCUMENTS

JP 2024176910 A 12/2024
WO 2021091769 A1 5/2021

OTHER PUBLICATIONS

International Search Report and Written Opinion from PCT/EP2022/079285 mailed May 4, 2023.
(Continued)

*Primary Examiner* — Quynh H Nguyen

(57) ABSTRACT

An (encoding) apparatus comprises a metadata generator (203) generating metadata for audio data for a plurality of audio elements representing audio sources in an environment. The metadata comprises acoustic environment data for the environment where the acoustic environment data describes properties affecting sound propagation for the audio sources in the environment. At least some of the acoustic environment data is applicable to a plurality of listening poses in the environment and the properties include both static and dynamic properties. A bitstream generator (205) generates the bitstream to include the metadata and often also audio data representing the audio elements for the audio sources in the environment. A decoding apparatus may comprise a receiver for receiving the bitstream and a renderer for rendering audio for the audio environment based on the acoustic environment data and on audio data for the audio elements.

17 Claims, 5 Drawing Sheets

(51) Int. Cl.
*H04S 3/00* (2006.01)
*H04S 7/00* (2006.01)

(52) U.S. Cl.
CPC .............. *H04S 7/302* (2013.01); *H04S 7/307* (2013.01); *H04S 7/40* (2013.01); *H04S 2400/01* (2013.01); *H04S 2400/11* (2013.01)

(56) References Cited

U.S. PATENT DOCUMENTS

| | | | | |
|---|---|---|---|---|
| 10,460,729 | B1 * | 10/2019 | Sun | G10L 25/30 |
| 11,211,902 | B2 | 12/2021 | Gaustavsson et al. | |
| 2014/0247946 | A1 | 9/2014 | Sen et al. | |
| 2019/0279653 | A1 | 9/2019 | Johnston et al. | |
| 2020/0154229 | A1 | 5/2020 | Habets et al. | |
| 2020/0228836 | A1 * | 7/2020 | Schwarz | H04N 13/117 |
| 2021/0092546 | A1 | 3/2021 | Terentiv et al. | |
| 2021/0287651 | A1 | 9/2021 | Eronen et al. | |

OTHER PUBLICATIONS

"WD1-CO Text of MPEG-H 3D Audio", 107. MPEG Meeting; Jan. 13, 2014-Jan. 17, 2014; San Jose; (Motion Picture Expert Group or ISO/IEC JTC1/SC29/WG11 ), No. n14263 Jan. 25, 2014 (Jan. 25, 2014), XP030271368.

* cited by examiner

BITSTREAM REPRESENTING AUDIO IN AN ENVIRONMENT

CROSS-REFERENCE TO PRIOR APPLICATIONS

This application is a continuation of U.S. application Ser. No. 18/701,635 filed on Apr. 16, 2024 which is the U.S. National Phase application under 35 U.S.C. § 371 of International Application No. PCT/EP2022/079285, filed on Oct. 20, 2022, which claims the benefit of EP Patent Application No. EP 21204639.5, filed on Oct. 26, 2021. These applications are hereby incorporated by reference herein.

FIELD OF THE INVENTION

The invention relates to a bitstream, as well as an apparatus for generating such a bitstream and an apparatus for processing such a bitstream, representing an audio environment, and in particular, but not exclusively, to a bitstream representing a virtual audio environment, such as for a Virtual Reality application.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented/Mixed Reality.

Communication of audiovisual data, and specifically, audio data, describing an environment, and specifically an audio environment, such that it can provide a flexible representation allowing user end adaptation to provide e.g. a VR experience is a very challenging task. The communicated data should preferably describe the environment such that it can locally be used to render a dynamic experience that reflects changes in (virtual) listening positions and changes in the environment itself.

A large amount of research has been undertaking to seek to derive advantageous approaches for efficient communication of data describing such environments. Various suggestions for suitable data streams and formats have been put forward with most of these including an individualized model where individual audio sources are presented separately and with associated metadata describing various properties, such as positions of the audio sources etc. In addition, some general data describing the audio environment may be provided, such as data describing reverberation, attenuation etc.

However, defining a bitstream format that provides efficient (e.g. reduced data rate) communication of such information is very difficult and many issues, characteristics, and trade-offs must be carefully considered and balanced to achieve an advantageous approach. The Moving Picture Experts Group (MPEG) has started a standardization approach for developing a standard known as MPEG-I for bitstreams suitable for VR and similar experiences.

Hence, an improved approach and data format/bitstream for supporting audio in immersive applications and services such as VR and AR would be advantageous. In particular, an approach/bitstream/format that allows improved operation, increased flexibility, reduced complexity, facilitated implementation, an improved audio experience, a reduced complexity, reduced computational burden, improved audio quality, reduced data rate, improved trade-offs, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to aspects and optional features of the invention, there is provided an apparatus for generating a bitstream, the apparatus comprising: a metadata generator (203) arranged to generate metadata for audio data for a plurality of audio elements representing audio sources in an environment, the metadata comprising acoustic environment data for the environment, the acoustic environment data describing properties affecting sound propagation for the audio sources in the environment, at least some of the acoustic environment data being applicable to a plurality of listening poses in the environment and the properties including both static and dynamic properties; and a bitstream generator (205) arranged to generate the bitstream to include the metadata.

The approach may provide improved performance and operation for many applications including immersive, flexible, and varying audiovisual applications such as e.g. for many VR and AR applications. The approach may provide improved trade-offs between different desires in many scenarios such as between the desire to provide accurate, complete, and/or dynamic data for an environment and the desire to provide a bitstream with low data rate. The approaches may in many scenarios provide a high degree of flexibility that may facilitate, improve, or even enable rendering side adaptation and customization. The approach may facilitate and/or improve rendering of audio of the environment, and specifically may facilitate and/or improve dynamic rendering of a changing environment and/or for a changing listening position.

The approach may specifically provide a carefully adapted audiovisual bitstream particularly suitable for dynamic applications where the bitstream provides a carefully selected and at least partially optimized data representation of an audio environment including both audio sources and acoustic properties of the environment and potentially of individual objects in the environment.

In some embodiments, the apparatus may further comprise an audio data generator arranged to generate the audio data for the plurality of audio elements representing audio sources in the environment, and the bitstream generator may be arranged to include the audio data in the bitstream.

A static property may be a time invariant property (at least for a time interval for which the property value is provided). A dynamic property may be a time variant property (at least for a time interval for which the property value is provided).

In many embodiments, at least one property is position and orientation dependent. In many embodiments, the acoustic environment data for at least one property is indicative of a position and/or orientation dependency. The position and/or orientation dependency may be a dependency on an orientation and/or position of an audio source and/or on an orientation and/or position of listener pose.

In some embodiments, the acoustic environment data is in the bitstream divided into a plurality of sequential data groups, each group of at least some groups providing a property value for a property of the properties affecting sound propagation.

In accordance with an optional feature of the invention, the acoustic environment data comprises a data group describing a data format for at least part of a representation of property values for at least one property of the properties affecting sound propagation and a plurality of data groups each comprising data describing at least one property value using the representation.

In some embodiments, the acoustic environment data comprises a data group describing a data format for a property of the properties affecting sound propagation and a plurality of data groups each comprising data describing a property value for the property in accordance with the data format.

A data group may be one or more data values and may specifically be a set of bits. A data group may be a set of data and may specifically be one or more data fields of the bitstream.

In some embodiments, the acoustic environment data comprises a data group describing a frequency grid and a plurality of data groups each comprising data describing a frequency dependent property of the properties using the frequency grid.

A frequency grid may be a subdivision of a frequency range into frequency subranges, e.g. by defining center frequencies of the frequency subranges.

In some embodiments, the bitstream comprises an indicator for indicating whether the bitstream comprises the data group describing the frequency grid.

In some embodiments, the data group comprises an indication of a format for data describing the frequency grid.

In some embodiments, the acoustic environment data comprises a data group describing a frequency grid and a plurality of data groups each comprising data describing a frequency dependent property of the properties using the frequency grid and wherein the bitstream comprises an indicator for indicating whether the bitstream comprises the data group describing the frequency grid and the data group comprises an indication of a format for data describing the frequency grid.

In some embodiments, the data group comprises at least one of: data providing an indication of a predetermined default grid; data indicating a start frequency and a frequency range for at least some subranges of the frequency grid; and data indicating individual frequencies.

At least one subrange or individual frequency indicated by data of the data group is aligned with fractions of octave bands.

In accordance with an optional feature of the invention, the acoustic environment data comprises a data group describing a frequency grid and a plurality of data groups each comprising data describing a frequency dependent property of the properties using the frequency grid and wherein the bitstream comprises an indicator for indicating whether the bitstream comprises the data group describing the frequency grid and the data group comprises an indication of a format for data describing the frequency grid, the data group comprising at least one of: data providing an indication of a predetermined default grid; data indicating a start frequency and a frequency range for at least some subranges of the frequency grid; and data indicating individual frequencies.

In some embodiments, the acoustic environment data comprises a data group describing an orientation representation format for representing orientation properties and a at least one data group comprising data describing an orientation property of the properties using the orientation representation format.

The bitstream may comprise an indicator for indicating whether the bitstream comprises the data group describing the orientation representation format.

In some embodiments, the data group comprises at least one of: data providing an indication of a predetermined default orientation representation; data indicating a set of predetermined angles; and data indicating angles on a quantized grid.

In accordance with an optional feature of the invention, the acoustic environment data comprises a data group describing an orientation representation format for representing orientation properties and a at least one data group comprising data describing an orientation property of the properties using the orientation representation format, the data group comprising at least one of: data providing an indication of a predetermined default orientation representation; data indicating a set of predetermined angles; and data indicating angles on a quantized grid.

In accordance with an optional feature of the invention, the acoustic environment data comprises a first data field for first bits representing a value of a first property of the properties affecting sound propagation and a second data field for an indication of whether the acoustic environment data comprises an extension data field for second bits representing the value of a first property.

In accordance with an optional feature of the invention, the second bits extend a range of possible values for the first property.

The second bits may be more significant bits of a data word representing the value of the first property than the first bits.

In accordance with an optional feature of the invention, the second bits increase a resolution of possible values for the first property.

The second bits may be less significant bits of a data word representing the value of the first property than the first bits. The second bits may extend an accuracy of possible values for the first property.

In some embodiments, the first property is a property from the group comprising: a temporal property; a spatial property; an amount; a gain property; a volume property; a frequency property; an index property; and an identity property.

In accordance with an optional feature of the invention, the metadata generator (203) is arranged to generate the acoustic environment data to include a global indicator that the environment is a spatially constrained environment and to restrict (at least one) data value(s) of the acoustic environment data to comply with a predetermined restricted format for data values for the global indicator indicating that the environment is spatially constrained.

A spatially restricted environment may be an environment having a spatial extension below a threshold value. The predetermined restricted format may be a data format for at least some values of properties affecting sound propagation that uses fewer bits than a data format used for the bitstream if the environment is not a spatially restricted environment.

The global indicator may be an optional indicator. In some embodiments, the global indicator may be indicative of whether the environment is a spatially constrained environment or is a less spatially constrained environment (or not spatially constrained environment)

In some embodiments the acoustic environment data includes an animation indication for at least a first audio element, the animation indication indicating if at least one property for the first audio element varies during a time interval.

In accordance with an optional feature of the invention, the acoustic environment data includes an animation indication for at least a first audio element, the animation indication indicating if at least one property for the first audio element varies during a time interval; and the acoustic environment data for an animation indication that the first audio element has at least one varying property comprises data describing a variation of the at least one varying property.

In some embodiments, if the animation indication is indicative that at least one property for the first audio element varies during the time interval, the acoustic environment data further comprises further animation indications for each if at least two properties, the further animation indications indicating whether the corresponding property is animated or not, and if the animation indication is indicative that no property for the first audio element varies during the time interval, the acoustic environment data comprises no further animation indications the at least two properties.

In some embodiments, if the animation indication is indicating that at least one property for the first audio element varies during the time interval, further animation indications are present for at least two properties, indicating whether the corresponding property is animated, and where the further animation indications are excluded when the animation indication is indicating that no at least one property for the first audio element varies during the time interval.

In some embodiments, the acoustic environment data comprises at least two values for the at least one varying property during the time interval and interpolation data describing a temporal interpolation for interpolating between the at least two values.

In accordance with an optional feature of the invention, the audio elements comprise a number of sound effect elements and the acoustic environment data comprises data linking a user controlled change to the environment with a first sound effect element of the number of sound effect elements.

In some embodiments, the acoustic environment data is arranged in consecutive data sets, each data set comprising data for a time interval.

The time intervals for different data sets are different.

In accordance with an optional feature of the invention, the acoustic environment data is arranged in consecutive data sets, each data set comprising data for a time interval, and a first data set of the consecutive data sets comprises a first property value for at least one property of the properties affecting sound and a time indication for the first property value, the time indication indicating a time within a time interval represented by the first data set.

In some embodiments, the first data set of the consecutive data sets comprises at least two property values for at least one property of the properties affecting sound and time indications for the at least two property values, the time indications indicating times within a time interval represented by the first data set.

In accordance with an optional feature of the invention, the acoustic environment data is arranged in consecutive data sets, each data set comprising data for a time interval and the bitstream generator (203) is arranged to determine if a property value for a first property of the properties affecting sound propagation is provided for a default time within a time interval represented by a first data set; and to include the first property value in the first data set without a time indication if so and to otherwise include the first property value in the first data set with a time indication for the first property value.

In some embodiments, the acoustic environment data comprises some complete rendering data sets including all data required for rendering audio of the environment; and some partial rendering data sets additionally requiring data from other data sets for rendering audio of the environment.

In some embodiments, the acoustic environment data for at least some elements of the environment comprises identity data and parent identity data for elements of a scene graph for the environment.

The at least some elements may e.g. objects, audio sources (audio elements) and/or acoustic characteristics of the environment In accordance with an optional feature of the invention, the acoustic environment data for a first audio element comprises an indication of a first region of applicability and a second region of applicability for a first property value for a first property of the properties affecting sound propagation, the first region of applicability indicating a region for a position of the first audio element for which the first property value applies and the second region of applicability indicating a region for a listening position for which the first property value applies.

In accordance with another aspect of the invention, there is provided an apparatus for generating rendered audio; the apparatus comprising: a first receiver (303) arranged to receive audio data for a plurality of audio elements representing audio sources in an environment; a second receiver (305) arranged to receive a bitstream comprising metadata for the audio data for the plurality of audio elements representing audio sources in the environment, the metadata comprising acoustic environment data for the environment, the acoustic environment data describing properties affecting sound propagation for the audio sources in the environment, at least some of the acoustic environment data being applicable to a plurality of listening poses in the environment and the properties including both static and dynamic properties; a renderer (307) arranged to generate output audio data for the environment in response to the audio data and the acoustic environment data.

In accordance with another aspect of the invention, there is provided a bitstream comprising metadata for audio data for a plurality of audio elements representing audio sources in an environment, the metadata comprising acoustic environment data for the environment, the acoustic environment data describing properties affecting sound propagation for the audio sources in the environment, at least some of the acoustic environment data being applicable to a plurality of listening poses in the environment and the properties including both static and dynamic properties.

In accordance with another aspect of the invention, there is provided a method of generating a bitstream, the method comprising: generating metadata for audio data for a plurality of audio elements representing audio sources in an environment, the metadata comprising acoustic environment data for the environment, the acoustic environment data describing properties affecting sound propagation for the audio sources in the environment, at least some of the acoustic environment data being applicable to a plurality of listening poses in the environment and the properties including both static and dynamic properties; and generating the bitstream to include the metadata.

In accordance with another aspect of the invention, there is provided a method of generating rendered audio; the method comprising: receiving audio data for a plurality of audio elements representing audio sources in an environment; receiving a bitstream comprising metadata for the audio data for the plurality of audio elements representing audio sources in the environment, the metadata comprising acoustic environment data for the environment, the acoustic environment data describing properties affecting sound propagation for the audio sources in the environment, at least some of the acoustic environment data being applicable to a plurality of listening poses in the environment and the properties including both static and dynamic properties; and generating output audio data for the environment in response to the audio data and the acoustic environment data These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
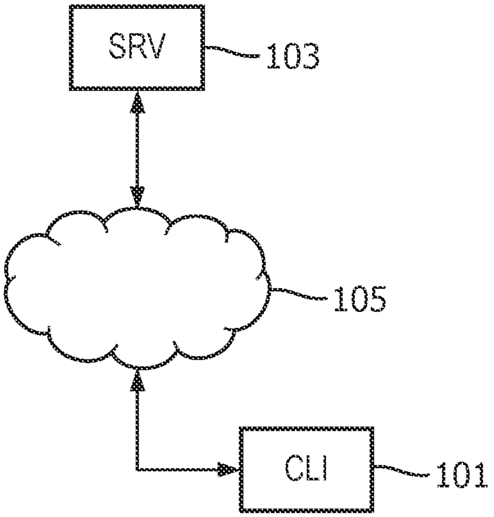
FIG. 1 illustrates an example of an audiovisual distribution system.

The following description will focus on an audiovisual application such as a Virtual Reality, VR, application, but it will be appreciated that the described principles and concepts may be used in many other applications and embodiments.

The following description will focus on generation of a bitstream providing a representation of audio of an environment. In many examples the audio representation is supplemented by a representation of the visual environment and the VR application is arranged to generate both audio and video to present to a user. The audio representation may supplement a visual representation of a virtual scene/environment or the bitstream may e.g. provide representations of a real world or hybrid environment. The bitstream may for example comprise data representing individual elements if the environment/scene such as audio sources, objects etc. In addition, more general information may be provided such as general acoustic or visual data (e.g. data describing reverberation, background colors etc).

However, it will be appreciated that the described principles and concepts may be used in many other applications and embodiments.

Virtual reality experiences may allow a device, such as a computer, to generate a virtual experience to a user by rendering three dimensional audio and video for a virtual scene and presenting it to a user. The user may typically move around and thus the viewer/listening pose may change dynamically. In many embodiments, the virtual scene/environment may also be a dynamic scene with e.g. objects moving or changing shape and with audio sources projecting audio at different times.

In the field, the terms placement and pose are used as a common term for position and/or direction/orientation. The combination of the position and direction/orientation of e.g., an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom). The term pose may be replaced by the term placement. The term pose may be replaced by the term position and/or orientation. The term pose may be replaced by the term position and orientation (if the pose provides information of both position and orientation), by the term position (if the pose provides information of (possibly only) position, or by orientation (if the pose provides information of (possibly only) orientation.

In many approaches, the VR application may be provided locally to a viewer by e.g. a stand-alone device that does not use, or even have any access to, any remote VR server. However, in other applications, a VR application may be based on data received from a remote or central server. For example, audio or visual data may be provided to the VR device from a remote central server and may be locally processed to generate a desired VR experience.

FIG. 1 illustrates such an example of a VR system in which a remote VR client device 101 liaises with a VR server 103 e.g. via a network 105, such as the Internet. The server 103 may be arranged to simultaneously support a potentially large number of client devices 101.

The VR server 103 may for example support an virtual reality experience by transmitting data defining elements of a virtual environment and objects to the client device 101.

The data may specifically describe visual features and geometric properties of a number of virtual objects that may be used by the client device 101 to generate graphics that can be presented to a user. In some embodiments, the data may also include various information that can be presented to the user. Further, the server 103 may provide audio data to the client device 103 that can be used to locally generate virtual sounds/audio that may further enhance the user experience and specifically the immersion.

The following description will focus on the generation of an audio bitstream providing a representation of an acoustic scene and environment, including typically both a representation audio sources and acoustic properties of the environment.

Figure 2:
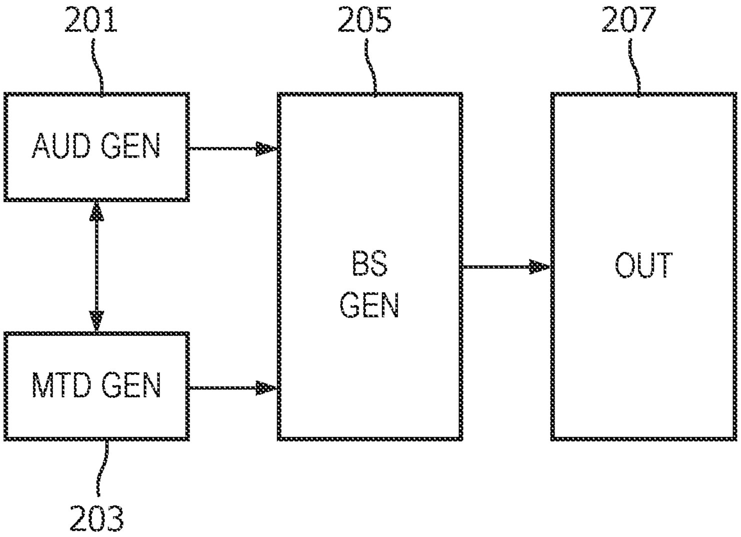
FIG. 2 illustrates an example of elements of an encoding apparatus in accordance with some embodiments of the invention.
Figure 3:
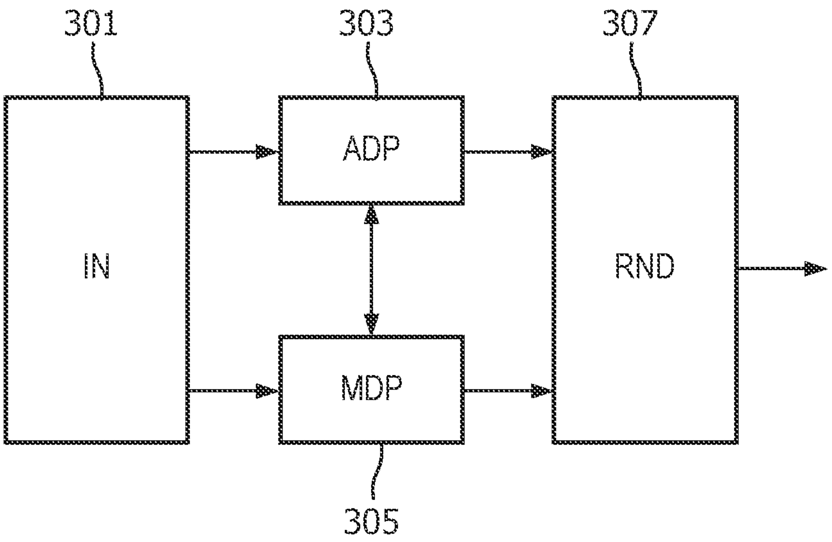
FIG. 3 illustrates an example of elements of a decoding apparatus in accordance with some embodiments of the invention.

FIG. 2 illustrates an example of an apparatus for generating a bitstream, and specifically the apparatus may be (comprised in) the server 103 of FIG. 1. The apparatus may specifically be an encoder/transmitter device. FIG. 3 illustrates an example of an apparatus for receiving and processing a bitstream such as the bitstream generated by the apparatus of FIG. 2. The apparatus of FIG. 3 may be a decoder/receiver, and may specifically be (part of) the client device 101 of FIG. 1. In the following, the apparatus of FIG. 2 will also be referred to as the encoder and the apparatus of FIG. 3 will also be referred to as the decoder.

In the example, the encoder generates a bitstream describing an audio environment. In the specific example, the bitstream comprises both audio data for the audio generated by audio sources in the environment as well as metadata describing the acoustic environment including typically both metadata for the individual audio sources and for the acoustic environment. However, in some embodiments, the audio data and the metadata may be provided in separate bitstreams, and specifically a separate bitstream may be generated comprising only metadata for audio data but with the actual audio data being provided separately in a different bitstream. Indeed, in some embodiments, the audio data may be provided from one source/provider and the additional metadata may be provided from another source/provider.

The encoder comprises an audio data generator 201 which is arranged to generate audio data for a plurality of audio elements representing audio sources in an environment. The audio generator may for example generate audio data from received audio data describing audio from audio elements representing individual audio sources or e.g. microphone captures, or may e.g. generate the audio data itself based on e.g. an audio model for the scene. In some embodiments, the audio data generator 201 may for example extract audio data for specific audio sources from a local store comprising suitable representations of audio from various audio sources. In other embodiments, audio data may alternatively or additionally, e.g. be generated from a microphone input capturing live audio.

The audio data generator 201 may generate the audio data to follow any suitable data format and any suitable encoding and representation etc. may be used. Thus, the audio data may be generated in any suitable way and represent the audio elements in any suitable way.

The audio elements may be audio objects, audio clips, audio channels, first- or higher order ambisonics (FOA, HOA) or any other audio element. Specifically, each audio element may be represented by a set of audio data characterizing audio that may be generated in the environment. The audio data is generally generated to include a plurality of sets of audio data for different audio elements, and specifically comprises sets of audio data for different audio sources represented by individual audio elements.

The encoder further comprises a metadata generator 203 which is arranged to generate metadata. The metadata comprises acoustic environment data for the environment where the acoustic environment data describes properties that affect sound propagation for the audio sources in the environment. The properties of the acoustic environment data may include acoustic properties of the environment (such as e.g. reverberation, reflection properties etc), properties of objects in the environment that may affect sound propagation (such as the position, orientation, size, material, attenuation, reflection etc of objects), or properties of audio sources/audio elements (such as position, orientation, size, volume, etc.).

The bitstream may comprise data groups of some data symbols/bits which together provide indications of property values for different properties affecting the perceived audio in the environment. Data groups may also be included which provide various other data including e.g. defining auxiliary parameters or formats for other data of the acoustic environment data.

A data group may simply be a sequence of bits indicating a data value/format/etc. or may be more complex combinations of data providing appropriate information. A data group may e.g. in many scenarios be considered to correspond to one or more data fields of the bitstream. A data field may include sub-data fields, i.e. a hierarchical arrangement of data fields that are themselves a combination of data fields may be applied.

The acoustic environment data may for example include metadata describing a pose (position and/or orientation) of one or more audio sources represented by audio elements, acoustic properties of the environment or of individual objects in the environment including e.g. (possibly frequency dependent) attenuation, reverberation characteristics, geometries of objects that may impact sound wave progression, material properties such as acoustic absorption, -reflection, -scattering, -coupling or transmission parameters, signal references, reference distances, rendering controlling flags, sound effect properties, user interaction metadata, etc.

The acoustic environment data includes data that may be applicable to a plurality of listening poses, and specifically may include data that a renderer can use to adapt a rendering of the audio elements such that it is dependent (different) for different listener poses (and specifically for different positions and/or orientations). Further, the acoustic environment data may include data for both static and dynamic properties. Specifically, the acoustic environment data may include data that is time independent and which describes a time invariant property (value) in at least a time interval for which the data is provided (such properties may thus be static). The acoustic environment data may further include data that is time dependent and which describes a time variant property (value) in at least a time interval for which the data is provided (such properties may thus be dynamic). For at least one property, the acoustic environment data may include data describing a time variation of a (value of the) property. The properties may be a property of one of the audio sources, audio elements, and/or of acoustic/sound propagation in the environment.

The encoder further comprises a bitstream generator 205 which is arranged to generate a bitstream that comprises audio data and the metadata (or in some embodiments only the metadata). The bitstream may be generated to meet one or more aspects and features of the specific data format that will be described in detail later.

The bitstream generator 205 is coupled to an output processor 207 which is arranged to output the generated bitstream. The output processor 207 may comprise the required functionality for communicating the bitstream as desired for the specific application. For example, the output processor may comprise a network interface, radio functionality, WiFi circuitry, Internet coupling functionality etc.

The decoder illustrated in FIG. 3 comprises a receiver or input processor 301 which is arranged to receive the bitstream generated by the encoder. The input processor 301 may comprise the required functionality for receiving the bitstream as desired for the specific application. For example, the input processor 301 may comprise a network interface, radio functionality, WiFi circuitry, Internet coupling functionality etc. It may in many embodiments comprise complementary functionality to that of the output processor 207 of the encoder.

The input processor 301 is coupled to an audio data processor 303 which is arranged to extract the audio data from the bitstream. Thus, the audio data processor 303 is arranged to extract, and in many cases process, audio data representing a number of audio elements of an environment. Typically, each audio element may correspond to one or more audio sources in the environment.

In the described example, the bitstream comprises the audio data describing the audio elements. In other embodiments, the audio data may not be comprised in the bitstream but may be received from another source, including possibly from an internal source of the decoder/client device. For example, an internal memory may store the audio data and the server 103 may provide additional metadata that may provide an enhanced experience such as for example by providing information enhancing audio to present dynamic animations where audio sources move in the environment. In some embodiments, the input processor 301 may be arranged to receive the audio data from an external source that is different from the server, e.g. it may be received as part of a different bitstream provided by a different server than the server 103 providing the metadata.

The decoder further comprises a metadata processor 305 which is arranged to extract the metadata from the bitstream. Thus, the metadata processor 305 is arranged to extract, and in many cases process, the meta data for the audio elements/environment. The metadata processor 305 may be arranged to extract the data and to generate appropriate property values for one, more, or all of the properties that are described by the metadata.

The decoder in the example comprises a processor for processing the audio data based on the metadata and property values. Specifically, the decoder may comprise a renderer 307 which is arranged to render one or more audio elements based on a property value of at least one of the properties represented by the metadata, where the property value is determined from the metadata. Typically, the renderer 307 may be arranged to render an audio scene corresponding to the environment by rendering one or more of the audio elements based on the metadata, such as e.g. with poses (and changes therein) being determined by the metadata, with frequency dependent attenuations based on metadata describing the environment and objects therein, with reverberation representing the reverberation properties of the environment as described by the metadata etc.

It will be appreciated that many algorithms, approaches, and techniques for rendering audio data based on environment and context data are known to the skilled person (including e.g. HRTF rendering, reverberation modelling etc.) and for brevity and clarity this will not be described in further detail herein.

The encoder is arranged to generate, and the decoder is arranged to receive, decode, and process, the bitstream in accordance with a data format that includes one or more of the features and aspects that will be described in the following. The approaches will be described with reference to a specific bitstream/format that may include most or all of the specific features and properties, but it will be appreciated that in many embodiments a bitstream will be generated that may e.g. include only some features or approaches. Indeed, the different features and elements of the described bitstream are not limited to be used together but rather are individual features that may be used individually or may be combined in any way with other described features.

In the specific example, a metadata bitstream is generated in which the acoustic environment data is arranged in consecutive data sets (data sets may also be referred to as data frames) where each data set comprising data for a time interval. The acoustic environment data may be arranged such that data values for a time interval is grouped together and specifically it may be grouped together as a consecutive data set wherein all encoded audio data stream that applies only to a single time interval is included into that data set and with the data set not comprising any acoustic environment data that applies only to a different time interval than the single time interval. In order to retrieve all data that is specific to a given time interval, the decoder only needs to decode that data set. In some embodiments, the acoustic environment data for a given time interval may also apply to other time intervals (e.g. some static acoustic environment data may apply to all time intervals) and such multi-interval data may be included in the data set for one of the time intervals, in data sets for more than one of the time intervals, in all data sets, or indeed outside the data sets, such as e.g. in a common data set provided separately from data sets for individual time intervals.

The bitstream may thus include data sets for different time intervals. In the following each data set will also be referred to as a data point for the bitstream.

The metadata bitstream may be generated which may include metadata that is often relatively static, and with animation/variation of the properties (for example a position, orientation, signal gain) being relatively slow. In the example, the bitstream is accordingly not organized into frames with duration in the range of a couple of milliseconds, but rather into data sets or data points representing time intervals of a much larger time scale. The time interval for a data set/data point may for example be no less than 0.5 sec, 1 sec, 2 sec, or even 5 seconds.

Figure 4:
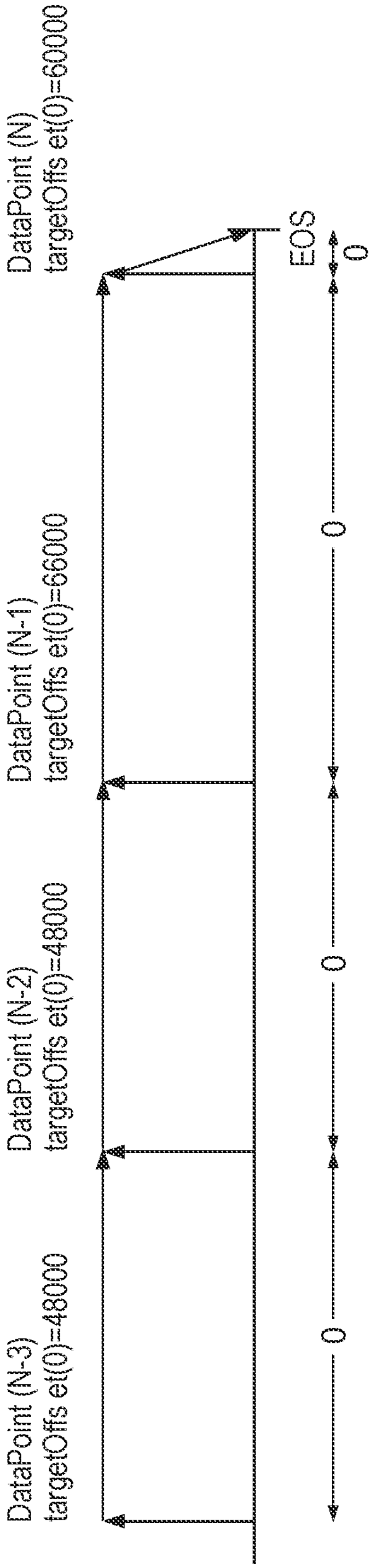
FIG. 4 illustrates a data structure for a bitstream in accordance with some embodiments of the invention.

The bitstream may include independent data points that contain sufficient data to start decoding a bitstream when tuning in randomly or when bitstreams are spliced. The data in such independent data points is not relying on any data from any previous data point. An example of a bitstream using the approach is illustrated in FIG. 4.

The duration of the time intervals represented by each data set/point may be flexible and may vary between groups. It may typically be in the order of a few seconds. The data point may be defined for a time stamp, which specifically may be a starting point, end point, or mid point for the data point. The metadata of a data point may represent data for properties of the acoustic environment data (such as specifically data indicating specific property values) for the time interval. For example, the value indicated may be that at the end of the time interval (e.g. where a next data point takes over, or where the scene ends). Furthermore, when values are time variant in the time interval, it may include data allowing the property values for other times within the time interval to be reconstructed may be included. For example, values within the time intervals may be determined by interpolation.

In the specific example, the time intervals may be indicated by data values of the bitstream. Similarly, data values within the time interval may be referenced and indicated to apply to specific time intervals which may be indicated by a data field/value. Specifically, a value referenced as targetOffset[n] may be used where n is an index.

In the approach, when time variations occur, such as when animations start, stop or change speed within the range, this may be supported using different approaches:

Way-points

Update data points

When a metadata field is animated, and the animation must be updated multiple times within the time interval of a data point, way-points may be included by including multiple targetOffsets within the data point's time interval. E.g.

$$targetOffset[0] = 48000$$

$$targetOffset[1] = 20000$$

$$targetOffset[2] = 38643$$

Figure 5:
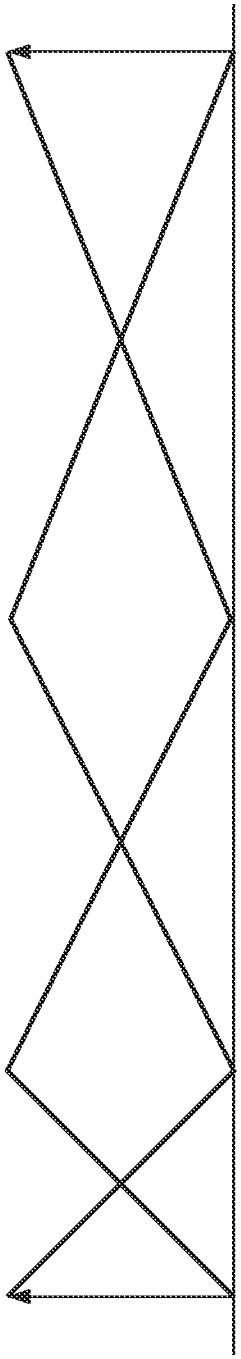
FIG. 5 illustrates an example of a varying property value represented in a bitstream in accordance with some embodiments of the invention.
Figure 6:
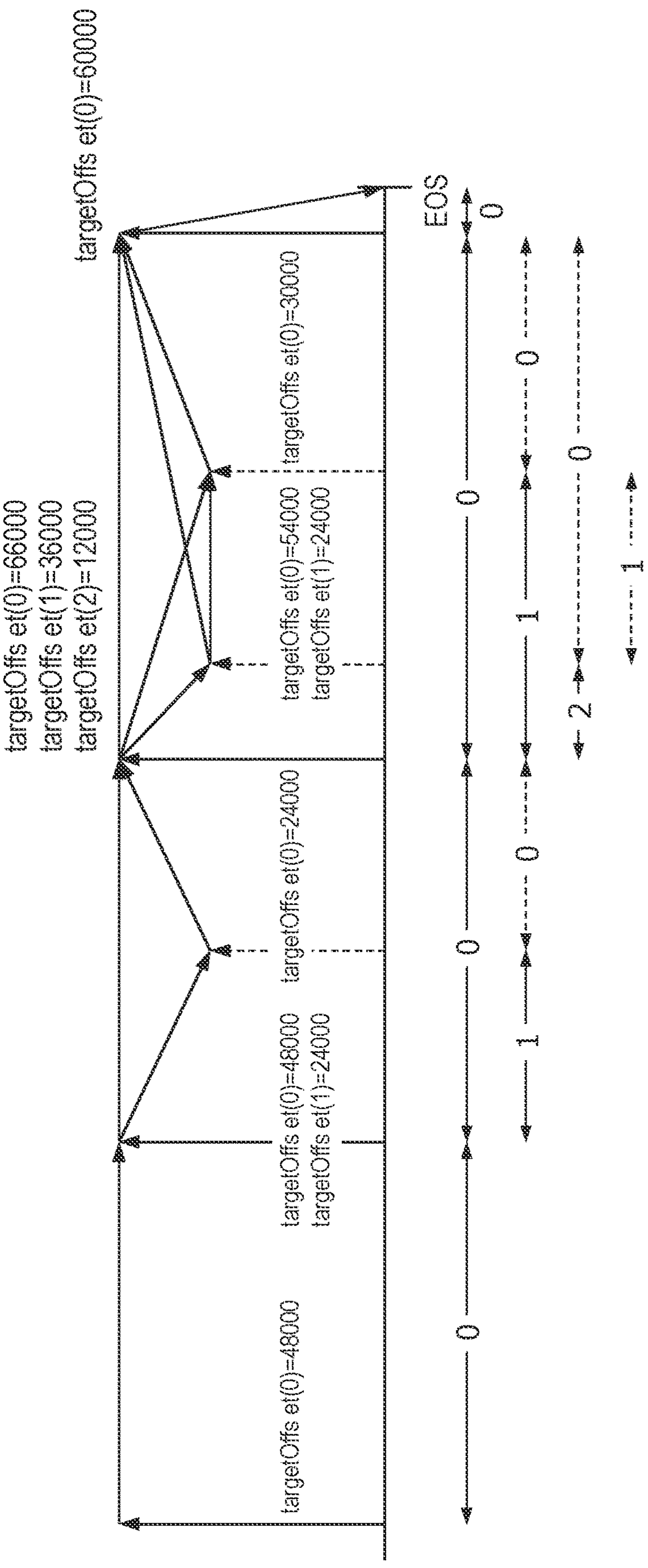
FIG. 6 illustrates a data structure for a bitstream in accordance with some embodiments of the invention.

The data point may include target values for one or more properties linked with a specific time point within the time interval, with the time point being indicated by a time indication, specifically in the form of a targetOffset field. Multiple target values can be provided, each paired with a targetOffset reference, resulting in multiple way-points, for which the value may be interpolated. FIG. 5 may illustrate how this can be used to provide varying parameter values.

Alternatively or additionally, dynamic variations may be supported by update data points which may be data points that are not independent. The update data points may not provide a sufficient data to allow a full rendering of the time interval but may rely on data provided elsewhere in the bitstream. The update data point may comprise only a subset of the acoustic environment data that describe the properties during the time interval represented by the update data point. In some embodiments, an update data point may always be linked with at least one independent data point.

The update data point may in some cases only include data about time varying properties (varying during the time interval). They may also have associated data indicating the time interval to which it applies, such as a start time, end time, and/or mid-point. They may have a maximum time interval duration that does not go beyond the next independent data point.

The advantage of update data points may be that they may be useful for live streaming of scene elements, for example movement and actions of other users, where corresponding fields are transmitted at a higher rate than independent data points.

The bitstream may accordingly comprise a plurality of consecutive data sets/data points which include one or more property values for a property of the environment that affects sound propagation. In addition, a time indication (e.g. targetOffset) may be included to indicate the time at which the property value is appropriate. In some embodiments, a data set may comprise two or more property values for one or more properties. The data set may include time indications that indicate when the property values apply for a varying property.

In some embodiments, the time indication may only be included if it differs from a default time within the time interval. E.g. property values may be indicated for the end of the time interval by default and no specific time indication is provided for property values that are provided for the end of the time interval. However, for any property value provided for another time within the time interval may be associated with a time indication.

Thus, in some embodiments, the bitstream generator 205 is arranged to determine if a property value for a given property is provided for a default time within a time interval represented. If so, the first property value is included in the data point without a time indication and otherwise a time indication is included for the property value.

The bitstream may be generated to include both data sets that are independent and which do not require any additional data for rendering as well as data sets that are not independent, but which require acoustic environment data from other data sets in order to allow a full rendering of the acoustic environment. Thus, the acoustic environment data may comprises some complete rendering data sets that include all data required for rendering audio of the environment as well as some partial rendering data sets that additionally rely on and require data from other data sets for rendering audio of the environment.

With the concept of data points being independent, and potentially covering gaps of up to a couple of seconds, it may be useful to include both start and stop points for the time interval of the data point, for example indicating the position at the start of the data point and at the end of the interpolation interval. This may be optional, as it may in many cases be acceptable that only the end-point is given, and a potential deviation may occur when a decoder cuts into a stream and only for the duration of the interval of the first decoded data point.

A source-pose end-point may often be considered the most important information, and it may include position and orientation data. In addition to that, an optional starting position/orientation may be provided. This could be coded differentially with respect to the end-point for more efficient coding to save bitrate. For non-interpolatable data (such as flags, identifiers, indices), there may be an offset at which the change will happen instantaneously, and the value at the start of the data point may be indicated (hence not be differential). For flags, the value at the start may not be indicated as it is assumed to be the opposite of the value following the indication provided.

In a JSON structure, an example of such an approach could be:

```
ObJectSource[ ]
  ID
  SignalIndex
  PreGain
  PreGainInterpMethod (optional)
  a PreGainInterpLengthIdx (optional)
  PreGainDelta (optional) % Presence signals animation
    in the data point
  Position
  PositionInterpMethod (optional)
  PositionInterpLengthIdx (optional)
  PositionDelta (optional) % Presence signals animation
    in the data point
  Orientation
  OrientationInterpMethod (optional)
```

OrientationInterpLengthIdx (optional)
OrientationDelta (optional) % Presence signals animation in the data point
a Render
RenderUpdateOffsetIdx (optional) % Presence signals animation in the data point
DirectivityID
DirectivityIDUpdateOffsetIdx (optional)
DirectivityIDStart (optional) % Presence signals animation in the data point Where the end-point is [Position, Orientation] and start-point is [Position−PositionDelta, Orientation−Orientation-Delta]. This means that the end position may be provided both as an absolute, as well as a relative, value allowing reconstruction of the start position when needed.

Different interpolation methods may be indicated, such as e.g. by the field InterpMethod defining one of the following:

'linear'<default>
'instant' (make the change instantly at the target timestamp without interpolation. E.g. useful for modification of SignalIndex, ExtentID or any of the boolean fields)
'spherical'
'logarithmic'

The target of the end-point may be the start of a next independent data point, any intermediate update data points, or an intermediate way-point. The potential targets may be listed in a general part of the bitstream and other parts of the bitstream can reference it efficiently to indicate which target is relevant for the data they cover. A target may be a target/intended value for a given time instant.

In the following an example of a format and syntax for the data of a single data point/data set will be described. The description will be in line with the approach for describing a bitstream format used in MPEG Audio standards such as MPEG-H 3D Audio (ISO/IEC 23008-3). The syntax description is structured as pseudo code where function calls indicate that the syntax described under that function is inserted in the place where the function call is made. Fields that occupy bits in the bitstream are bold-faced, and the second and third column describe the number of bits and the bit format, using mnemonics. Some fields may have variable nr of bits, depending on the value that is represented. These fields are associated with a look-up table describing the code word and corresponding values. The code words are designed such that when starting to read bit by bit a shorter code word is never overlapping with the first bits of a longer code word. This is known to the person skilled in the art as lossless data encoding or entropy coding, such as Huffman coding, run-length coding or arithmetic coding. Data that has been read earlier in the syntax may be used in later parts of the syntax for controlling decoding of other parts. For example, by informing number of bits, number of elements, method of encoding, presence of certain data, etc.

The description will use the following specific acronyms (as taken from the MPEG-H 3D Audio specification, ISO/IEC 23008-3):

bslbf—Bit string, left bit first, where "left" is the order in which bit strings are written in ISO/IEC 14496. Bit strings are written as a string of 1s and 0s within single quote marks, for example '1000 0001'. Blanks within a bit string are for ease of reading and have no significance.
Used for booleans
tcimsbf—Two's complement integer, most significant (sign) bit first.
uimsbf—Unsigned Integer Most Significant Bit First.
Used for uints
vlclbf—Variable length code, left bit first, where "left" refers to the order in which the variable length codes are written.

A data set/point may be provided in accordance with the following format/syntax:

DataPoint( )

| Syntax | #bits | Type |
|---|---|---|
| DataPoint( ) | | |
| { | | |
| dpType; | 2 | uimsbf |
| DEBUG_DATA( ); | | |
| [fs, isSmallScene] = GeneralData( ); | | |
| TargetData(fs); | | |
| FreqGridData( ); | | |
| DirectivityPatternData( ); | | |
| AcousticElementData(isSmallScene, fs); | | |
| AudioSourceData( ); | | |
| AcousticEnvironmentData(fs); | | |
| MaterialData( ); | | |
| VoxelData( ); | | |
| GeometricElementData(isSmallScene); | | |
| UserInteractionData(isSmallScene, fs); | | |
| reservedBits; | 16 | |
| } | | |

In the following, various fields/parts/elements of such a data point will be described in more detail but it will be appreciated that the described fields/parts/elements are not limited to the specific data point or syntax but may be used individually or in any combination in any bitstream comprising acoustic environment data.

Further description of features/fields/parts elements for the data point.

dpType

Data point type. Indicates the type of the data point.

| Value | Type |
|---|---|
| 0 | Independent data point - used for random access into the bitstream |
| 1 | Update data point - used for carrying data updates in between independent data points. Relies on information from previous independent data point. |
| 2 | Reserved |
| 3 | Reserved |

reservedBits

Reserved bits. These can be used to introduce an extension mechanism.

Thus, the data point may start with two bits that indicate the specific type of the data point with the two bits specifically indicating whether the data point is an independent data point or whether it is am update point.

GeneralData( )

The field GeneralData( ) may provide data providing information on several parameters with generic configuration or rendering data.

| Syntax | #bits | Type |
|---|---|---|
| [fs, isSmallScene] = GeneralData( ) | | |
| { | | |
| bsVersion; | 4 | uimsbf |
| isSmallScene; | 1 | bslbf |
| fs = LUT(usacSamplingFrequencyIndex); | 5 | bslbf |
| if (usacSamplingFrequency == 0x1f) | | |
| { | | |

-continued

| Syntax | #bits | Type |
|---|---|---|
| fs = usacSamplingFrequency; | 24 | uimsbf |
| } | | |
| if (useDefaultSpeedOfSound == false) | 1 | bslbf |
| { | | |
| speedOfSound = 343; | | |
| } else | | |
| { | | |
| speedOfSound; | 14 | uimsbf |
| } | | |
| return [fs, isSmallScene]; | | |
| } | | |

bsVersion
Bitstream version.

| Value | Description |
|---|---|
| 0 | First version for CfP response |
| 1 . . . 15 | Reserved |

isSmallScene

When set to true, indicates that no coordinate beyond the range of [−100 . . . 100] meter is present.

In some embodiments, the metadata generator 203 is arranged to generate the acoustic environment data to include a global indicator that the environment is a spatially constrained environment. For example, the global indicator may be in the form of the isSmallScene which can be set to be true or false. If set to true, the isSmallScene is limited to be represented by coordinates that do not exceed [−100 . . . 100] meters.

When the global indicator is set to indicate a spatially constrained environment, a number of data values will be restricted to comply with a predetermined restricted format for data values. Specifically, spatial coordinates (specifically position values) may be restricted to not exceed a threshold, such as being limited to the interval of [−100 . . . 100] meters. In some embodiments, other parameters may be restricted to limited ranges when the global indicator is set to indicate a spatially constrained environment. For example, a maximum duration or time constant of a reverberation, e.g. a $T_{60}$ value, may be restricted for a small environment.

A spatially restricted environment may be an environment having a spatial extension below a threshold value. The predetermined restricted format may be a data format for at least some values of properties affecting sound propagation that uses fewer bits than a data format used for the bitstream if the environment is not a spatially restricted environment.

In some embodiments, a global flag or indicator may be included that indicate limitations of one or more parameter values.

usacSamplingFrequencyIndex
Index for the sample-rate used for the audio signals. Based on definition in 23003-3:

| usacSamplingFrequencyIndex | sampling frequency |
|---|---|
| 0x00 | 96000 |
| 0x01 | 88200 |
| 0x02 | 64000 |
| 0x03 | 48000 |
| 0x04 | 44100 |

-continued

| usacSamplingFrequencyIndex | sampling frequency |
|---|---|
| 0x05 | 32000 |
| 0x06 | 24000 |
| 0x07 | 22050 |
| 0x08 | 16000 |
| 0x09 | 12000 |
| 0x0a | 11025 |
| 0x0b | 8000 |
| 0x0c | 7350 |
| 0x0d | reserved |
| 0x0e | reserved |
| 0x0f | 57600 |
| 0x10 | 51200 |
| 0x11 | 40000 |
| 0x12 | 38400 |
| 0x13 | 34150 |
| 0x14 | 28800 |
| 0x15 | 25600 |
| 0x16 | 20000 |
| 0x17 | 19200 |
| 0x18 | 17075 |
| 0x19 | 14400 |
| 0x1a | 12800 |
| 0x1b | 9600 |
| 0x1c | reserved |
| 0x1d | reserved |
| 0x1e | reserved |
| 0x1f | escape value |

NOTE:
The values of UsacSamplingFrequencyIndex 0x00 up to 0x0e are identical to those of the samplingFrequencyIndex 0x0 up to 0xe contained in the AudioSpecificConfig( ) specified in ISO/IEC 14496-3: 2009 usacSamplingFrequency
Output sampling frequency of the decoder coded as unsigned integer value in case usacSamplingFrequencyIndex equals zero.

useDefaultSpeedOfSound
Flag indicating whether to use the default speed of sound for the material-less medium (343 m/s, the value at 20° C.) or provide a custom value.

speedOfSound
Custom speed of sound value for the material-less medium. A material-less medium is considered the space that is not occupied by geometry that has a different material assigned to it.

TargetData( )
The field TargetData( ) may comprise target offsets for animations of attributes, that are referenced by index from other parts of the data point.

| Syntax | #bits | Type |
|---|---|---|
| TargetData(fs) | | |
| { | | |
| tdNrTargets = GetCountOrIndex( ); | | |
| for t = 0:tdNrTargets − 1 | | |
| { | | |
| targetOffset[t] = GetDuration(fs); | | |
| } | | |
| } | | |

FreqGridData( )

This field may contain frequency grid definitions that are referenced by index from other parts of the data point. Typically, this informs that part of the bitstream parser how many frequency dependent elements will be coded next.

The field FreqGridData( ) may provide data providing information on frequency grid definitions that are referenced by index from other parts of the data point. Specifically, a frequency grid/subdivision into frequency ranges may be described and other parameters/other data of the bitstream may be provided in accordance with the defined frequency grid. For example, different frequency dependent filtering may be provided by indicating an attenuation for the different ranges of the defined frequencies of the frequency grid, and thus a filter can be described simply as a set of attenuation values without requiring the corresponding frequencies for these attenuation values to be explicitly described.

In some embodiments, the acoustic environment data may be arranged to comprise one or more data groups/data fields describing a frequency grid and a plurality of data groups/data fields each comprising data describing a frequency dependent property of the properties using the frequency grid. The data describing a frequency dependent property of the properties using the frequency grid may for example do this by providing a data value for one or more of the frequency values and/or frequency values defined by the frequency grid.

A frequency grid may be a subdivision of a frequency range into frequency subranges, for example by defining center frequencies of the frequency subranges.

In some embodiments, the bitstream may comprise an indicator for indicating whether the bitstream comprises a data group describing the frequency grid or not. For example, a single bit, bFgdPresent, may indicate whether a frequency grid definition is included (e.g. in the following bits).

In some embodiments, the bitstream may include an indication of a format for data describing the frequency grid. For example, the bitstream may include an indication describing whether the frequency grid is described by a reference to a predetermined/predefined grid, such as e.g. by indicating an index for a grid out of a set of predefined frequency grids. As another example, the bitstream may include data indicating a start frequency and a frequency range for at least some subranges of the frequency grid, and typically for all subranges of the frequency grid. In some embodiments, the frequency grid may be indicated by a set of transition frequencies indicating the border frequencies of the frequency ranges/intervals. For example, a first frequency interval/range may be indicated by data indicating the start frequency of the first frequency interval/range and the start frequency of the next frequency interval/range.

In many embodiments, the frequency ranges may be constant in a logarithmic representation of the frequency scale.

The frequency banding and division into ranges/intervals may be based on octaves. One octave difference represents a factor of two, i.e. a doubling of the frequency, e.g. 125, 250, 500, 1000 Hz. The bitstream may indicate, for example, whether there is banding at octave bands or another subdivision, for example one third octave bands which place two more values between the octave bands (125, 160, 200, 250, 315, 400, 500, 630, 800, 1000). In some embodiments, at least one subrange or individual frequency may be indicated by data aligned with fractions of octave bands.

In some embodiments, the bitstream may include data indicating individual frequencies, such as for example a set of multiple individual frequencies. Other frequency dependent properties may then in the bitstream be represented simply by a set of property values for these individual frequencies without these individual frequencies needing to be explicitly stated for each property.

In many embodiments, a frequency grid may then be described/defined by data of the bitstream. Different modes for the frequency grid may e.g. be used and data may indicate the mode used to describe the frequency grid.

For example, a field fgdMethod may indicate which mode is used, e.g. out of the following:

Default grids

E.g. aligned with fractions of octave bands

Start-frequency+frequency hop-size+amount of bands

E.g. aligned with fractions of octave bands dividual frequencies

E.g. aligned with fractions of octave bands

An example of a format/syntax for the frequency grid may for example be as follows:

| Syntax | #bits | Type |
|---|---|---|
| FreqGridData( ) | | |
| if (bFgdPresent) | 1 | bslbf |
| { | | |
| fgdNrGrids = GetCountOrIndex( ); | | |
| for g = 0:fgdNrGrids − 1 | | |
| { | | |
| fgdMethod; | 2 | uimsbf |
| if (fgdMethod == ‘Individual frequencies’) | | |
| { | | |
| fgdNrBands[g] = GetCountOrIndex( ); | | |
| for b = 0:fgdNrBands[g] − 1 | | |
| { | | |
| fgdCenterFreq[g][b] = GetFrequency( ); | | |
| } | | |
| } elseif (fgdMethod == ‘Start-Hop-Amount’) | | |
| { | | |
| fgdNrBands[g] = GetCountOrIndex( ); | | |
| fgdCenterFreq[g][0] = GetFrequency( ); | | |
| frequencyHop = LUT(frequencyHopCode); | var | vlclbf |
| for b = 1:fgdNrBands[g] − 1 | | |
| { | | |
| fgdCenterFreq[g][b] = fgdCenterFreq[g][b − 1] * frequencyHop; | | |
| } | | |
| } elseif (fgdMethod == ‘Default banding’) | | |
| { | | |
| fgdDefaultBanding; | 4 | |
| } | | |
| } | | |
| } | | |
| } | | |

bFgdPresent

Flag indicating whether any frequency grids are defined.

fgdMethod

Method with which the frequency grid is coded.

| Value | Name |
|---|---|
| 0 | Individual frequencies |
| 1 | Start-Hop-Amount |
| 2 | Default banding |
| 3 | Reserved |

fgdCenterFreq

Indicates the center frequency in Hz, for each band in each frequency grid.

frequencyHopCode

Code indicating the hop-factor for the frequency banding.

| Codeword | Value |
|---|---|
| 1100 | 2^(1/8) |
| 1101 | 2^(1/7) |
| 0010 | 2^(1/6) |
| 0011 | 2^(1/5) |
| 0000 | 2^(1/4) |
| 01 | 2^(1/3) |
| 0001 | 2^(1/2) |
| 10 | 2^1 |
| 111 | 2^2 |

fgdDefaultBandingDefines one several default banding schemes.

| Value | fgdCenterFreq[g] |
|---|---|
| 0 | [100 200 500 1000 2000 5000 10000] |
| 1 | [1000 2000 3000 4000 5000 6000 7000 8000] |
| 2 . . . 15 | Reserved |

Thus, in some embodiments, the bitstream is generated to include a data group that describes a frequency grid that is used in other data groups to describe frequency dependent properties of the acoustic environment data. Thus, a frequency grid is both provided in the data stream and used to describe the frequency variation. Further, the bitstream includes a specific indicator to indicate whether the bitstream includes this description of a frequency grid or not. Accordingly, a flexible approach is provided where the bitstream generation can be adapted to use an optional and customizable frequency grid that can be optimized for the specific properties and frequency dependency that is to be communicated. As a simple example, the frequency resolution or frequency range can flexibly be adapted, and indeed the entire frequency grid description is optional and can be left out by suitably setting the indicator of whether the description is included.

Further, the arrangement may be such that the data group does not only include a description of the frequency grid but it also specifically indicates the format that is used for the description of the frequency grid. Thus, an indication may be provided that allows the receiver to interpret the frequency grid description data thereby allowing the bitstream generator the freedom to select a format for the description of the frequency grid that is particularly suitable for the specific properties and their specific frequency dependency.

The data group describing the frequency grid may includes data indicating a predetermined default grid; a start frequency and a frequency range for at least some subranges of the frequency grid; and/or individual frequencies.

Thus, the approach may allow a bitstream to include frequency variant properties by using a specific and narrow approach of encoding and representing such acoustic environment data in a bitstream. The approach may provide a highly efficient, adaptable, and flexible approach for including such frequency dependent acoustic environment properties in a bitstream.

AcousticElementData( )

This part of the syntax covers data describing acoustic elements. These are typically generic elements that serve as hierarchical elements in the scene graph. Typically, properties of such elements carry over to child nodes. I.e., pregain values of acoustic elements also apply on audio sources that are organized under the corresponding acoustic element. The position and orientation of these nodes will transform the position and orientation of its child nodes, unless those nodes have their pose-dependency setting configured to ignore parent orientation or pose.

In some embodiments, the acoustic environment data includes an animation indication for at least one audio element where the animation indication indicates whether a property for the audio element varies during a time interval or not, and thus whether it is a dynamic or static property. Specifically, for a data point/group, a flag or indication may be included to indicate whether the audio element is static or time varying within the time interval of the data point/group.

The acoustic environment data may in the case where the animation indication does indicate that the corresponding audio is time varying further include data that describes a variation of the varying property. The acoustic environment data may for such an audio element comprise data indicating for at least one property for the audio element whether that property is a time varying property or not. Thus, indications may be included for properties indicating which properties are time varying and which are not time varying (within the time interval of the data set/point).

In many embodiments, the acoustic environment data may include data describing how property values for different times of the time interval can be determined, and specifically the acoustic environment data may include data describing an interpolation approach to apply to determine property values for different times.

The acoustic environment data may comprise two or more values for a specific time varying property with each value being for a specific time instant. Property values for other times can then be determined by interpolation. The encoded audio data stream, and specifically the individual data point, may include data describing properties of the temporal interpolation that should be performed for a time varying property.

In some cases, one or more of the values used for interpolation within a time interval of a data point may be provided or determined from values provided outside of the time interval/data point. For example, one or more values may be derived from data of another data point, which e.g. may have been transmitted earlier in the bitstream. Such a data value may be associated with a specific time point (e.g. indicated by a time stamp) which may be a time that is before or after the time interval of the data point for which the interpolation is applied (and for which it may be defined)
.

In some embodiments, different interpolations may be described in different data points and thus different interpolations may be applied in different time intervals. Also, different interpolations may be described for different properties, including possibly different properties of the same data point/time interval.

Interpolation methods may for example be indicated by a code represented by the flag *InterpMethod. The code may for example be as indicated in Table 1 below:

| Code | Method |
|---|---|
| 0 | Linear |
| 1 | Instantaneous |
| 2 | Reserved |
| 3 | Reserved |
| 4 | Reserved |
| 5 | Reserved |
| 6 | Reserved |
| 7 | Reserved |

In some embodiments, the acoustic environment data for at least some elements of the environment may comprise identity data and parent identity data for elements of a scene graph for the environment. The at least some elements may be e.g. objects, audio sources (audio elements) and/or acoustic characteristics of the environment For example, different objects and/or audio sources may be arranged in a scene graph and the acoustic environment data may comprise data indicative of this scene graph. This may specifically be by providing identity data and parent identity for individual elements as this may allow a scene graph to be reconstructed, and thus may be arranged to represent a hierarchy.

In some embodiments, animations of elements may be indicated (and possibly be described) in the acoustic environment data.

For example, the acoustic environment data may include ElementAnimated, SourceAnimated and AttributeAnimated flags/indications which per element/source indicate whether this is animated (in a segment of time). If so, a flag/indication per attribute/property may be included to indicate whether the attribute/property is animated. If so, then data describing the animation/time variation may further be included.

As an example of the above described features, the following format may be used:

| Syntax | #bits | Type |
|---|---|---|
| AcousticElementData(isSmallScene) | | |
| { | | |
| if (aedPresent) | 1 | bslbf |
| { | | |
| aedNrElements = GetCountOrIndex( ); | | |
| for e = 0:aedNrElements − 1 | | |
| { | | |
| elementAnimated; | 1 | bslbf |
| aedID = GetID( ); | | |
| aedParentID = GetID( ); | | |
| aedPoseDependency; | 3 | uimsbf |
| aedPosition = GetPosition(isSmallScene); | | |
| if (elementAnimated) | | |
| { | | |
| if (attributeAnimated) | 1 | bslbf |
| { | | |
| aedPositionInterpMethod; | 3 | uimsbf |
| aedPositionInterpTargetIdx = GetCountOrIndex( ); | | |
| aedPositionDelta = GetPositionDelta(isSmallScene); | | |
| while (attributeAnimated) | 1 | bslbf |
| { | | |
| aedPosition = GetPosition(isSmallScene); | | |
| aedPositionInterpTargetIdx = GetCountOrIndex( ); | | |
| } | | |
| } | | |
| } | | |
| aedOrientation = GetOrientation( ); | | |
| if (elementAnimated) | | |
| { | | |
| if (attributeAnimated) | 1 | bslbf |
| { | | |
| aedOrientationInterpMethod; | 3 | uimsbf |
| aedOrientationInterpTargetIdx = GetCountOrIndex( ); | | |
| aedOrientationDelta = GetOrientation( ); | | |
| while (attributeAnimated) | 1 | bslbf |
| { | | |
| aedOrientation = GetOrientation( ); | | |
| aedOrientationInterpTargetIdx = GetCountOrIndex( ); | | |
| } | | |
| } | | |

-continued

| Syntax | #bits | Type |
|---|---|---|
| } | | |
| aedPregain = GetGain( ); | | |
| if (elementAnimated) | | |
| { | | |
| if (attributeAnimated) | 1 | bslbf |
| { | | |
| aedPregainInterpMethod; | 3 | uimsbf |
| aedPregainInterpTargetIdx = GetCountOrIndex( ); | | |
| aedPregainDelta = GetGainDelta( ); | | |
| while (attributeAnimated) | 1 | bslbf |
| { | | |
| aedPregain = GetGain( ); | | |
| aedPregainInterpTargetIdx = GetCountOrIndex( ); | | |
| } | | |
| } | | |
| } | | |
| aedRender; | 1 | bslbf |
| if (elementAnimated) | | |
| { | | |
| while (attributeAnimated) | 1 | bslbf |
| { | | |
| aedRenderUpdateTargetIdx = GetCountOrIndex( ); | | |
| } | | |
| } | | |
| } | | |
| } | | |
| } | | |

aedPresent
Flag indicating whether any acoustic elements are defined.
aedNrElements
Signals the number of acoustic elements defined.
elementAnimated
Flag that indicates whether the corresponding element is animated in the data point.
attributeAnimated
Flag that indicates whether the corresponding attribute is animated in the data point. It is also used to indicate whether data for more way-points is present.
aedID
ID of the acoustic element.
aedParentID
ID of the parent of the acoustic element in the scene graph.
aedPoseDependency
Indicates what the acoustic element's pose is relative to.
aedPosition
Position coordinates of the acoustic element (x, y, z), in meters.

Multiple occurrences for the same element indicate multiple way-points within the data point's range.

aedPositionInterpMethod
Indicates interpolation method to use for position animation, see table 1.
aedPositionInterpTargetIdx
Index to TargetOffset, to indicate at what offset from the data point's time stamp the preceding position target value is valid.
Multiple target indices may be provided, one for each way-point within the data point's range.
aedPositionDelta
Position delta value that allows reconstruction of the position value at the data point's time stamp.

$$PositionAtDPStart = aedPosition - aedPositionDelta$$

In case of multiple target values, it is relative to the first target value.

aedOrientation

Orientation of the acoustic element (yaw, pitch, roll), in radians.

Multiple occurrences for the same element indicate multiple way-points within the data point's range.

aedOrientationInterpMethod

Indicates interpolation method to use for orientation animation, see table 1.

aedOrientationInterpTargetIdx

Index to TargetOffset, to indicate at what offset from the data point's time stamp the preceding orientation target value is valid.

Multiple target indices may be provided, one for each way-point within the data point's range.

aedOrientationDelta

Orientation delta value that allows reconstruction of the orientation value at the data point's time stamp.

$$OrientationAtDPStart = aedOrientation - aedOrientationDelta$$

In case of multiple target values, it is relative to the first target value.

aedPregain

Pregain value in dB for all sources hierarchically placed under the corresponding acoustic element.

Multiple occurrences for the same element indicate multiple way-points within the data point's range.

aedPregainInterpMethod

Indicates interpolation method to use for pregain animation, see table 1.

aedPregainInterpTargetIdx

Index to TargetOffset, to indicate at what offset from the data point's time stamp the preceding pregain target value is valid.

Multiple target indices may be provided, one for each way-point within the data point's range.

aedPregainDelta

Pregain delta value that allows reconstruction of the pregain value at the data point's time stamp.

$$PregainAtDPStart = aedPregain - aedPregainDelta$$

In case of multiple target values, it is relative to the first target value.

aedRender

Render flag. When false, indicates that all sources hierarchically placed under the corresponding acoustic element should not be rendered.

aedRenderUpdateTargetIdx

Index to TargetOffset, to indicate at what offset from the data point's time stamp the render flag flips state to the preceding aedRender value.

Multiple target indices may be provided, one for each way-point within the data point's range, each target index indicates a binary flip of the flag's state.

AudioSourceData( ) AudioSourceData( )

This part of the syntax collects different types of audio sources.

| Syntax | #bits | Type |
|---|---|---|
| AudioSourceData(isSmallScene, fs) | | |
| { | | |
| ObjectSourceData(isSmallScene); | | |
| HOASourceData(isSmallScene); | | |
| SoundEffectData(fs); | | |
| } | | |

ObjectSourceData( )

This part of the syntax describes properties of object sources.

| Syntax | #bits | Type |
|---|---|---|
| ObjectSourceData(isSmallScene) | | |
| { | | |
| if (osdPresent) | 1 | bslbf |
| { | | |
| osdNrElements = GetCountOrIndex( ); | | |
| for e = 0:osdNrElements − 1 | | |
| { | | |
| sourceAnimated; | 1 | bslbf |
| osdID = GetID( ); | | |
| osdParentID = GetID( ); | | |
| osdSignalIndex = GetCountOrIndex( ); | | |
| osdIsContinuousSource; | 1 | bslbf |
| osdReferenceDistance = GetDistance(isSmallScene); | | |
| osdPoseDependency; | 3 | uimsbf |
| osdPosition = GetPosition(isSmallScene); | | |
| if (sourceAnimated) | | |
| { | | |
| if (attributeAnimated) | 1 | bslbf |
| { | | |
| osdPositionInterpMethod; | 3 | uimsbf |
| osdPositionInterpTargetIdx = GetCountOrIndex( ); | | |
| osdPositionDelta = GetPositionDelta(isSmallScene); | | |
| while (attributeAnimated) | 1 | bslbf |
| { | | |
| osdPosition = GetPosition(isSmallScene); | | |
| osdPositionInterpTargetIdx = GetCountOrIndex( ); | | |
| } | | |
| } | | |
| } | | |
| osdOrientation = GetOrientation( ); | | |
| if (sourceAnimated) | | |
| { | | |
| if (attributeAnimated) | 1 | bslbf |
| { | | |
| osdOrientationInterpMethod; | 3 | uimsbf |
| osdOrientationInterpTargetIdx = GetCountOrIndex( ); | | |
| osdOrientationDelta = GetOrientation( ); | | |
| while (attributeAnimated) | 1 | bslbf |
| { | | |
| osdOrientation = GetOrientation( ); | | |
| osdOrientationInterpTargetIdx = GetCountOrIndex( ); | | |
| } | | |
| } | | |
| } | | |
| osdPregain = GetGain( ); | | |
| if (sourceAnimated) | | |
| { | | |
| if (attributeAnimated) | 1 | bslbf |
| osdPregainInterpMethod; | 3 | uimsbf |
| osdPregainInterpTargetIdx = GetCountOrIndex( ); | | |
| osdPregainDelta = GetGainDelta( ); | | |
| while (attributeAnimated) | 1 | bslbf |
| { | | |
| osdPregain = GetGain( ); | | |
| osdPregainInterpTargetIdx = | | |

-continued

```
Syntax                                              #bits  Type
GetCountOrIndex( );
          }
        }
      }
      osdRender;                                    1      bslbf
      if (sourceAnimated)
      {
        while (attributeAnimated)                   1      bslbf
        {
          osdRenderUpdateTargetIdx =
GetCountOrIndex( );
        }
      }
      if (osdIsOmniDirectional == false)            1      bslbf
      {
        osdDirectivityPatternID = GetID( );
      }
      if (osdIsPointSource == false)                1      bslbf
      {
        osdExtentID = GetID( );
      }
      GetRenderingConditions( );
    }
  }
}
```

osdPresent

Flag indicating whether object sources are present.

osdNrElements

Indicates number of object source elements that follow.

sourceAnimated

Flag that indicates whether the corresponding source is animated in the data point.

aedID

ID of the acoustic element.

aedParentID

ID of the parent of the acoustic element in the scene graph.

osdSignalIndex

Indicates the index into the signal input buffer of the signal corresponding to the source.

osdlsContinuousSource

Flag that indicates whether associated to a continuous signal or a decoder-side-triggered sound effect.

osdReferenceDistance

Indicates the reference distance of the object source.

osdPoseDependency

Indicates what the source pose is relative to.

attributeAnimated

Flag that indicates whether the corresponding attribute is animated in the data point. It is also used to indicate whether data for more way-points is present.

osdPosition

Position coordinates of the object source (x, y, z), in meters.

Multiple occurrences for the same source indicate multiple way-points within the data point's range.

osdPositionInterpMethod

Indicates interpolation method to use for position animation, see table 1.

osdPositionInterpTargetIdx

Index to TargetOffset, to indicate at what offset from the data point's time stamp the preceding position target value is valid.

Multiple target indices may be provided, one for each way-point within the data point's range.

osdPositionDelta

Position delta value that allows reconstruction of the object source's position value at the data point's time stamp.

$$PositionAtDPStart = osdPosition - osdPositionDelta$$

In case of multiple target values, it is relative to the first target value.

osdOrientation

Orientation of the object source (yaw, pitch, roll), in radians. Multiple occurrences for the same source indicate multiple way-points within the data point's range.

osdOrientationInterpMethod

Indicates interpolation method to use for orientation animation, see table 1.

osdOrientationInterpTargetIdx

Index to TargetOffset, to indicate at what offset from the data point's time stamp the preceding orientation target value is valid.

Multiple target indices may be provided, one for each way-point within the data point's range. osdOrientation-Delta Orientation delta value that allows reconstruction of the object source's orientation value at the data point's time stamp.

$$OrientationAtDPStart = osdOrientation - osdOrientationDelta$$

In case of multiple target values, it is relative to the first target value.

osdPregain

Pregain value in dB for the object source.

Multiple occurrences for the same element indicate multiple way-points within the data point's range.

osdPregainInterpMethod

Indicates interpolation method to use for pregain animation, see table 1.

osdPregainInterpTargetIdx

Index to TargetOffset, to indicate at what offset from the data point's time stamp the preceding pregain target value is valid.

Multiple target indices may be provided, one for each way-point within the data point's range.

osdPregainDelta

Pregain delta value that allows reconstruction of the object source's pregain value at the data point's time stamp.

$$PregainAtDPStart = osdPregain - osdPregainDelta$$

In case of multiple target values, it is relative to the first target value.

osdRender

Render flag. When false, indicates that the object source should not be rendered.

osdRenderUpdateTargetIdx

Index to TargetOffset, to indicate at what offset from the data point's time stamp the render flag flips state to the preceding osdRender value.

Multiple target indices may be provided, one for each way-point within the data point's range, each target index indicates a binary flip of the flag's state.

osdIsOmniDirectional

Flag that indicates whether the source is omnidirectional.

osdDirectivityPatternID

ID of the directivity pattern to use.

SoundEffectData( )

This part of the syntax describes properties of sound effects. These are not continuously rendered audio signals, but represent short segments of audio signals that are triggered by, e.g., user interactions.

The acoustic environment data may in some embodiments provide metadata associated with sound effects, clips, and other audio elements and the metadata may in particular include data for sound effect audio elements that are associated with specific user actions or interactions. For example, a sound effect element may be provided for a creaking door being opened. Such a sound effect may be associated with a user action such that if a user provides an input corresponding to a door being opened in the environment, the renderer may extract and render the creaking door sound effect.

In some embodiments, the audio elements may comprise a number of sound effect elements and the acoustic environment data may comprise data linking a user controlled change to the environment with one (or more) of such sound effect elements. The user controlled change to the environment may for example be a user input or user interaction or may be determined based on these (or result from these).

The acoustic environment data may for example indicate modifications for certain user interactions by referencing e.g. a target ID (identifying the element), target attribute and/or corresponding target value. A list of these changes can be executed in response to a trigger ID.

As a specific example, a starting of sound effect rendering may be indicated using a SoundEffectID as an attribute to a sound source and with the sound effect ID of the sound effect to be played being included as a target value.

Sound effect data may for example be provided in accordance with the following syntax:

| Syntax | #bits | Type |
|---|---|---|
| SoundEffectData(fs) | | |
| { | | |
| if (sedPresent) | 1 | bslbf |
| { | | |
| sedNrElements = GetCountOrIndex( ); | | |
| for e = 0:sedNrElements − 1 | | |
| { | | |
| sedID = GetID( ); | | |
| sedParentID = GetID( ); | | |
| sedDuration = GetDuration( ); | | |
| sedPregain = GetGain( ); | | |
| } | | |
| } | | |
| } | | |

sedPresent

Flag indicating whether sound effect data is present.

sedNrElements

Indicates number of sound effect elements that will be defined next.

sedID

ID of the sound effect.

acdParentID

ID of the parent of the sound effect in the scene graph.

sedDuration

Duration of the sound effect.

sedPregain

Pregain value for the sound effect.

In some embodiments, the acoustic environment data may include data that is associated with specific regions. For example, property values may be provided together with an indication of a specific region in which it is applicable. For example, for a given audio source, the property (such as a frequency dependent attenuation) may depend on whether the listener is in the same room as the audio source or whether the user is in a different room. The property may thus be provided with an indication of a linked region in which the listening position must be in order for the value to be valid. If the listening position is outside the applicable zone, the property cannot be validly used. Instead, another property value may for example be included with a different region of applicability which includes the current listening position.

In many embodiments, the metadata may for one or more properties include multiple linked regions and specifically may include a first and second region of applicability where the first region is provided for the audio element/audio source position and the second region is provided for the listening position. Thus, the property value may be associated with two regions with one relating to the listening position and the other to the audio source position. The decoder/renderer may then evaluate whether the listening position and the audio source position are within the appropriate regions. If not, another property value may be used, such as either a default value, a value associated with other validity regions that include the listening and audio source positions, or an alternative property value provided as an alternative for the original value and indicated to be used of the validity regions are not met.

As a specific example, the bitstream may include fields/data denoted applicableRegion and internalSourceRegion to represent respectively a validity region for respectively the listening position and the audio source/audio element position.

As an example, the bitstream may include data for a first property value that is dependent on the listening position and whether this is within the region indicated by the value in the data field applicableRegion. Then, this value is further directly applicable to audio sources which are in the region indicated by the value in the data field internalSourceRegion whereas a different property value will apply when outside the region indicated in the data field internalSourceRegion.

An example of data of a bitstream using such approaches are included in the following.

AcousticEnvironmentData( )

This part of the syntax describes (overall) properties of the (general) acoustic environments/surroundings. Specifically reverberation properties.

| Syntax | #bits | Type |
|---|---|---|
| AcousticEnvironmentData(fs) | | |
| { | | |
| if (acdPresent) | 1 | bslbf |
| { | | |
| acdNrElements = GetCountOrIndex( ); | | |
| for e = 0:acdNrElements − 1 | | |
| { | | |
| acdID = GetID( ); | | |
| acdParentID = GetID( ); | | |
| applicableRegionID = GetID( ); | | |

-continued

| Syntax | #bits | Type |
|---|---|---|
| internalSourceRegionID = GetID( ); | | |
| freqGridIdx = GetCountOrIndex( ); | | |
| dsrOffset = GetDuration(fs); | | |
| for b = 0:fgdNrBands[freqGridIdx] | | |
| { | | |
| T60[e][b] = GetDuration(fs); | | |
| dsr[e][b] = LUT(dsrCode); | var | vlclbf |
| } | | |
| } | | |
| } | | |
| } | | |

acdPresent
Flag indicating whether acoustic environment data is present.

acdNrElements
Indicates number of acoustic environments defined.

acdID
ID of the acoustic environment definition.

acdParentID
ID of the parent of the acoustic environment definition in the scene graph.

applicableRegionID
ID of a geometric element describing the region where the parameters apply. Position and orientation will be offset by the acoustic environment's parent, unless its pose dependency is global.

internalSourceRegionID
ID of geometric elements describing the region for which all enclosed sources contribute all their energy to the reverb. Position and orientation will be offset by the acoustic environment's parent, unless its pose dependency is global.

freqGridIdx
Index in the list of frequency grids defined in FreqGridData( ).

dsrOffset
Offset in seconds from where DSR is calculated in the RIR, offset=0 coincides with emission at the source. Thus, it should be higher.

T60
T60 time calculated from 0 to −30 dB points in a linear part of the EDC, after early decay.

DSR
Diffuse to Source energy Ratio. Diffuse reverb energy is calculated after RIR lag dsrOffset and for one user's sample point. Source energy is the total emitted source energy that gives rise to that diffuse energy.

dsrCode
Code indicating DSR value.

| Codeword | Value |
|---|---|
| 10001100 | −150 |
| 10001101 | −149 |
| 100011110 | −148 |
| 100011111 | −147 |
| 100011100 | −146 |
| 100011101 | −145 |
| 10000010 | −144 |
| 10000011 | −143 |
| 10000000 | −142 |
| 10000001 | −141 |
| 10000110 | −140 |
| 10000111 | −139 |
| 10000100 | −138 |
| 10000101 | −137 |

-continued

| Codeword | Value |
|---|---|
| 011101010 | −136 |
| 011101011 | −135 |
| 011101000 | −134 |
| 011101001 | −133 |
| 011101110 | −132 |
| 011101111 | −131 |
| 011101100 | −130 |
| 011101101 | −129 |
| 011100010 | −128 |
| 011100011 | −127 |
| 011100000 | −126 |
| 011100001 | −125 |
| 011100110 | −124 |
| 011100111 | −123 |
| 011100100 | −122 |
| 011100101 | −121 |
| 011111010 | −120 |
| 011111011 | −119 |
| 011111000 | −118 |
| 011111001 | −117 |
| 011111110 | −116 |
| 011111111 | −115 |
| 011111100 | −114 |
| 011111101 | −113 |
| 011110010 | −112 |
| 011110011 | −111 |
| 011110000 | −110 |
| 011110001 | −109 |
| 011110110 | −108 |
| 011110111 | −107 |
| 011110100 | −106 |
| 011110101 | −105 |
| 011001010 | −104 |
| 011001011 | −103 |
| 011001000 | −102 |
| 011001001 | −101 |
| 011001110 | −100 |
| 011001111 | −99 |
| 011001100 | −98 |
| 011001101 | −97 |
| 011000010 | −96 |
| 011000011 | −95 |
| 011000000 | −94 |
| 011000001 | −93 |
| 011000110 | −92 |
| 011000111 | −91 |
| 011000100 | −90 |
| 011000101 | −89 |
| 011011010 | −88 |
| 011011011 | −87 |
| 011011000 | −86 |
| 011011001 | −85 |
| 011011110 | −84 |
| 011011111 | −83 |
| 011011100 | −82 |
| 011011101 | −81 |
| 010100 | −80 |
| 010101 | −79 |
| 100110 | −78 |
| 100111 | −77 |
| 100100 | −76 |
| 100101 | −75 |
| 111010 | −74 |
| 111011 | −73 |
| 111000 | −72 |
| 111001 | −71 |
| 111110 | −70 |
| 111111 | −69 |
| 111100 | −68 |
| 111101 | −67 |
| 110010 | −66 |
| 110011 | −65 |
| 110000 | −64 |
| 110001 | −63 |
| 110110 | −62 |
| 110111 | −61 |
| 110100 | −60 |

-continued

| Codeword | Value |
|---|---|
| 110101 | −59 |
| 001010 | −58 |
| 001011 | −57 |
| 001000 | −56 |
| 001001 | −55 |
| 001110 | −54 |
| 001111 | −53 |
| 001100 | −52 |
| 001101 | −51 |
| 000010 | −50 |
| 000011 | −49 |
| 000000 | −48 |
| 000001 | −47 |
| 000110 | −46 |
| 000111 | −45 |
| 000100 | −44 |
| 000101 | −43 |
| 101010 | −42 |
| 101011 | −41 |
| 101000 | −40 |
| 101001 | −39 |
| 101110 | −38 |
| 101111 | −37 |
| 101100 | −36 |
| 101101 | −35 |
| 010010 | −34 |
| 010011 | −33 |
| 010000 | −32 |
| 010001 | −31 |
| 010110 | −30 |
| 011010010 | −29 |
| 011010011 | −28 |
| 011010000 | −27 |
| 011010001 | −26 |
| 011010110 | −25 |
| 011010111 | −24 |
| 011010100 | −23 |
| 011010101 | −22 |
| 010111010 | −21 |
| 010111011 | −20 |
| 010111000 | −19 |
| 010111001 | −18 |
| 010111110 | −17 |
| 010111111 | −16 |
| 010111100 | −15 |
| 010111101 | −14 |
| 10001010 | −13 |
| 10001011 | −12 |
| 10001000 | −11 |
| 10001001 | −10 |

This part of the syntax describes geometric elements.

| Syntax | #bits | Type |
|---|---|---|
| GeometricElementData(isSmallScene) | | |
| { | | |
|   if (gedPresent) | 1 | bslbf |
|   { | | |
|     gedNrElements = GetCountOrIndex( ); | | |
|     for e = 0:gedNrElements − 1 | | |
|     { | | |
|       gedID = GetID( ); | | |
|       gedType; | 3 | uimsbf |
|       if (gedType == 0) | | |
|       { | | |
|         cornerPos1 = GetPosition(isSmallScene); | | |
|         cornerPos2 = GetPosition(isSmallScene); | | |
|       } | | |
|       elseif (gedType == 1) | | |
|       { | | |
|         boxParentID = GetID( ); | 3 | uimsbf |
|         boxPoseDependency; | | |
|         boxPosition = GetPosition(isSmallScene); | | |
|         boxOrientation = GetOrientation( ); | | |

-continued

| Syntax | #bits | Type |
|---|---|---|
|         boxXDim = GetDistance(isSmallScene); | | |
|         boxYDim = GetDistance(isSmallScene); | | |
|         boxZDim = GetDistance(isSmallScene); | | |
|       } | | |
|     } | | |
|   } | | |
| } | | |

gedPresent
Flag indicating whether acoustic environment data is present.
gedNrElements
Indicates the number of geometric elements defined.
gedID
ID of the geometric element.
gedType
Defines the type of geometry element that is conveyed next.

| Value | Meaning |
|---|---|
| 0 | Simple bounding box |
| 1 | Box |
| 2 | Sphere |
| 3 | Cilinder |
| 4 | Mesh |
| 5 | Reserved |
| 6 | Reserved |
| 7 | Reserved |

cornerPos1
Contains one corner of an axis aligned box. Position represents global coordinates.
cornerPos2
Contains the second corner of an axis aligned box, diagonally across the box from cornerPos1. Position represents global coordinates.
boxParentID
ID of the parent node of the corresponding box geometric element.
boxPoseDependency
Indicates what the acoustic element's pose is relative to.
boxPosition
Position coordinates of the box geometry (x, y, z), in meters.
boxOrientation
Orientation of the box geometry (yaw, pitch, roll), in radians.
boxXDim
Dimension of the box geometry along the x axis before any rotation.
boxYDim
Dimension of the box geometry along the y axis before any rotation.
boxZDim
Dimension of the box geometry along the z axis before any rotation.
UserInteractionData( )

This part of the syntax describes user interaction data. It describes how a user interaction can be triggered, and what changes should be made in response to a trigger, by describing for which elements, which attribute has to be changed into which value, or whether this value is provided from an external entity (e.g. for fully user controlled interaction, such as picking up a source and moving it around the scene).

A more semantical definition of user interactions may be defined on a higher bitstream level, covering all aspects of 6DoF media rendering such as visuals, audio, haptics. A user interaction can have impact on all or a subset of these aspects. This system layer (in the case of MPEG-I, covered by MPEG Systems working group WG03) defines how a user can trigger a certain interaction, this may be in terms of defining the activation of the controller's trigger button within a certain spatial region of the scene, or in a more abstract sense where other layers link the abstract meaning to hardware-dependent controls. For example: If user opens door 5, activate user interaction G.

Such user interaction triggers on a system level may send dedicated user interaction triggers to the respective media renders. E.g. system-level user interaction G may be linked to Audio user interaction 12, and the audio renderer subsequently executes the changes associated with user interaction with triggerID=12.

In many embodiments, such user interaction triggers may be accompanied with further parameters for more immersive user interactions. For example, it may provide position coordinates of a sound source that is picked up and being moved by the user.

Such user interactions that are triggered from outside an audio renderer may be called externally triggered. Others may rely on being triggered by the audio renderer itself. The distinction between such triggers may be indicated by a triggerType property in the bitstream describing the user interaction changes.

| Syntax | #bits | Type |
|---|---|---|
| UserInteractionData(isSmallScene, fs) | | |
| { | | |
| if (uidPresent) | 1 | bslbf |
| { | | |
| uidNrElements = GetCountOrIndex( ); | | |
| for e = 0:uidNrElements − 1 | | |
| { | | |
| triggerType; | 3 | uimsbf |
| if (triggerType < 2) | | |
| { | | |
| triggerIdx = GetCountOrIndex( ); | | |
| } | | |
| if (triggerType == 2) | | |
| { | | |
| triggerID = GetID( ); | | |
| condTransition; | 1 | bslbf |
| updateDelay = GetDuration(fs); | | |
| } | | |
| nrChanges = GetCountOrIndex( ); | | |
| for u = 0:nrChanges − 1 | | |
| { | | |
| if (u > 0) | | |
| { | | |
| usePreviousID; | 1 | bslbf |
| } | | |
| else | | |
| { | | |
| usePreviousID = 0; | | |
| } | | |
| if (!usePreviousID) | | |
| { | | |
| previousTargetID = targetID; | | |
| targetID = GetID( ); | | |
| } | | |
| else | | |
| { | | |
| targetID = previousTargetID; | | |
| } | | |
| if (!immediateChange) | 1 | bslbf |
| { | | |
| duration = GetDuration(fs); | | |
| } | | |
| else | | |
| { | | |
| duration = 0; | | |
| } | | |
| targetAttribute = LUT(attribCode); | var | vlclbf |
| if (triggerType == 1) | | |
| { | | |
| externalParameter; | 1 | bslbf |
| } | | |
| else | | |
| { | | |
| externalParameter = 0; | | |
| } | | |
| if (externalParameter) | | |
| { | | |
| parameterIdx = LUT(paramIdxCode); | var | vlclbf |
| while (moreParameters) | 1 | bslbf |
| { | | |
| parameterIdx = LUT(paramIdxCode); | var | vlclbf |
| } | | |
| } | | |
| else | | |
| { | | |
| switch (targetAttribute) | | |
| { | | |
| case Position: | | |
| targetValue = GetPosition(isSmallScene); | | |
| case Orientation: | | |
| targetValue = GetOrientation( ); | | |
| case Pregain: | | |
| targetValue = GetGain( ); | | |
| case Render: | | |
| targetValue = render; | 1 | bslbf |
| case SignalIndex: | | |
| targetValue = GetCountOrIndex( ); | | |
| case SoundEffectID: | | |
| targetValue = GetID( ); | | |
| case : | | |
| targetValue = <TBD.> | | |
| } | | |
| } | | |
| } | | |
| } | | |
| } | | |
| } | | |

uidPresent

Flag indicating whether user interactions are present.

triggerType

Defines the way that the user interaction triggers the scene update.

| Value | Meaning |
|---|---|
| 0 | External (no parameters) - Scene update triggered by an external process without externally provided parameters. |
| 1 | External (with parameters) - Scene update triggered by an external process with externally provided parameters. |
| 2 | ProximityCondition - Update triggered by an internal process that checks for a user proximity condition. |
| 3 | Reserved |
| 4 | Reserved |
| 5 | Reserved |
| 6 | Reserved |
| 7 | Reserved |

triggerIdx

Index used in the user interaction message from the external source to trigger this specific scene update.

triggerID

ID of the condition element that describes the condition to describe this specific scene update.

condTransition
When the condition changes to the indicated transition value, it will trigger the update.
updateDelay
How much the update should be delayed after it is triggered.
nrChanges
Indicates the number of changes for this scene update.
usePreviousID
Flag indicating whether the change will be for the same ID as the previous change.
immediateChange
Flag indicating whether the change is immediate or is interpolated to its target value over a certain duration.
duration
Interpolation duration of the change.
targetAttribute
Name of the attribute to be changed.
attribCode
Code indicating a modifiable attribute.

| Codeword | Value |
|---|---|
| 01 | Position |
| 11 | Orientation |
| 10 | Pregain |
| 001 | Render |
| 0001 | SignalIndex |
| 0000 | SoundEffectID |

externalParameter
Flag indicating whether the parameter value is provided by the external process.
parameterIdx
Index of the parameter in the message from the external process that maps to this attribute.
paramIdxCode
Code indicating the parameter index.

| Codeword | Value |
|---|---|
| 000 | 0 |
| 111 | 1 |
| 101 | 2 |
| 100 | 3 |
| 0111 | 4 |
| 0101 | 5 |
| 0100 | 6 |
| 0011 | 7 |
| 1101 | 8 |
| 1100 | 9 |
| 01101 | 10 |
| 00101 | 11 |
| 00100 | 12 |
| 011001 | 13 |
| 0110001 | 14 |
| 0110000 | 15 |

moreParameters
Flag indicating whether an additional parameter is present.
targetValue
Target value for the change. Depending on the target attribute's type, the value may be coded differently, as indicated by the switch statement in the syntax.
Support Elements The bitstream may comprise various support elements that may support the provision of data representing property values.

Also, in many embodiments, the number of bits used to indicate values of properties may be variable in the bitstream. In particular, property values may be indicated by a field comprising a predetermined number of bits. However, a flag indicator may be included to indicate that one or more extension fields are included providing additional bits for the property value. The extension fields may specifically provide additional bits for extending the range of a property value. In particular, an extension field may include further Most(/More) Significant Bits for to be combined with data bits of the default field to generate a property value with (dynamic) range (and specifically it may provide additional bits that can allow higher values to be represented).

In other scenarios, the extension field(s) may specifically provide additional bits for extending the accuracy of a property value. In particular, an extension field may include further Least(/Less) Significant Bits for to be combined with data bits of the default field to generate a property value with higher accuracy.

In some embodiments, the acoustic environment data may comprise a first data field that provide first bits which represent a value of a given property and a second data field which may provide an indication for the first data field/the given property which may comprise an indication of whether a further extension data field is included which provide further bits representing the value of a first property. The indication may e.g. be an indication that the extension field comprises bits for extending the range of a provided data value and/or an indication that the extension field comprises bits for increasing the accuracy/resolution of the provided data value. Specifically, the indication may indicate that the value is represented by a larger data word that results from a combination of bits from both the first/default field and from the extension field In some embodiments, the further bits extend a range of possible values for the property. The further bits may be more significant bits of a data word representing the value of the property than the first bits. In some embodiments, the further bits increase a resolution of possible values for the property. The further bits may be less significant bits of a data word representing the value of the first property than the first bits. The further bits may extend an accuracy of possible values for the first property.

In many embodiments, the default bits and the further bits are not necessarily combined by concatenating the bits, but rather they may each represent values that are combined in other ways.

Thus, in some embodiments, the acoustic environment data may include indications/flag(s) which indicate that further bits are used to determine a value for a property. The approach may be used for many different property values including e.g. a spatial property; an amount; a gain property; a volume property; a frequency property; an index property; and an identity property.

For example, to indicate that a larger range is provided the following fields may be used:

For a measure of time: addSeconds
For a measure of space: addHectometers
For a measure of amount: isLargerNumber
For (integer) ID numbers: largerValue To indicate that a more accurate (higher resolution) value is provided the following fields may be used:

For a measure of time: addMilliseconds
For a measure of space: addCentimeters
For a measure of frequency: moreAccuracy
For a measure of angle: addFineAngle
For a measure of gain: addFineGain.

Various support elements for the bitstream will be described in the following. The support elements may use variable range/resolution values as described above.

GetID( )

Returns an integer ID.

| Syntax | #bits | Type |
|---|---|---|
| GetID( ) | | |
| { | | |
| id = idVal; | 7 | uimsbf |
| while (largerValue) | 1 | bslbf |
| { | | |
| idVal; | 7 | uimsbf |
| id = id * 128 + idVal; | | |
| } | | |
| } | | |

idVal

ID value or partial ID value.

largerValue

Flag that indicates whether the ID value is larger.

GetCountOrIndex( )

Returns a number in the range [0 . . . 1023].

| Syntax | #bits | Type |
|---|---|---|
| number = GetCountOrIndex( ) | | |
| { | | |
| number = LUT(countOrIndexLoCode); | var | vlclbf |
| if (isLargerNumber) | 1 | bslbf |
| { | | |
| numberHi = LUT(countOrIndexHiCode); | var | vlclbf |
| number = number + numberHi * 64; | | |
| } | | |
| return number; | | |
| } | | |

countOrIndexLoCode

Code indicating the lower bits of a count or index value.

| Codeword | Value |
|---|---|
| 0111 | 0 |
| 100 | 1 |
| 01100 | 2 |
| 01101 | 3 |
| 01010 | 4 |
| 01011 | 5 |
| 01000 | 6 |
| 01001 | 7 |
| 001111 | 8 |
| 001110 | 9 |
| 001101 | 10 |
| 001100 | 11 |
| 001011 | 12 |
| 001010 | 13 |
| 001001 | 14 |
| 001000 | 15 |
| 000111 | 16 |
| 000110 | 17 |
| 000101 | 18 |
| 000100 | 19 |
| 000011 | 20 |
| 000010 | 21 |
| 000001 | 22 |
| 000000 | 23 |
| 111111 | 24 |
| 111110 | 25 |
| 111101 | 26 |
| 111100 | 27 |
| 111011 | 28 |
| 111010 | 29 |

-continued

| Codeword | Value |
|---|---|
| 111001 | 30 |
| 111000 | 31 |
| 1101111 | 32 |
| 1101110 | 33 |
| 1101101 | 34 |
| 1101100 | 35 |
| 1101011 | 36 |
| 1101010 | 37 |
| 1101001 | 38 |
| 1101000 | 39 |
| 1100111 | 40 |
| 1100110 | 41 |
| 1100101 | 42 |
| 1100100 | 43 |
| 1100011 | 44 |
| 1100010 | 45 |
| 1100001 | 46 |
| 1100000 | 47 |
| 1011111 | 48 |
| 1011110 | 49 |
| 1011101 | 50 |
| 1011100 | 51 |
| 1011011 | 52 |
| 1011010 | 53 |
| 1011001 | 54 |
| 1011000 | 55 |
| 1010111 | 56 |
| 1010110 | 57 |
| 1010101 | 58 |
| 1010100 | 59 |
| 1010011 | 60 |
| 1010010 | 61 |
| 1010001 | 62 |
| 1010000 | 63 |

isLargerNumber

Flag indicating whether more bits are sent to indicate a larger number.

countOrIndexHiCode

Code indicating the higher bits of a count or index value.

| Codeword | Value |
|---|---|
| 001 | 1 |
| 000 | 2 |
| 110 | 3 |
| 101 | 4 |
| 100 | 5 |
| 0111 | 6 |
| 0101 | 7 |
| 1111 | 8 |
| 1110 | 9 |
| 01101 | 10 |
| 01001 | 11 |
| 01000 | 12 |
| 011001 | 13 |
| 0110001 | 14 |
| 0110000 | 15 |

GetDuration( )

Returns a temporal duration in samples.

| Syntax | #bits | Type |
|---|---|---|
| duration = GetDuration(fs) | | |
| { | | |
| deciSeconds = LUT(deciSecondsCode); | var | vlclbf |
| duration = deciSeconds * fs; | | |
| if (addMilliseconds) | 1 | bslbf |
| { | | |
| miliSeconds = LUT(milliSecondsCode); | var | vlclbf |
| duration = duration + miliSeconds * fs; | | |

-continued

```
Syntax                                            #bits  Type
        if (addSamples)                           1      bslbf
        {
          samples = LUT(samplesCode);             var    vlclbf
          duration = duration + samples;
        }
      }
      if (addSeconds)                             1      bslbf
      {
        seconds = LUT(secondsCode);               var    vlclbf
        duration = duration + seconds * fs;
      }
      duration = round(duration);
      return duration;
    }
```

LUT( )
Execute query on look-up table corresponding to the field whose value is provided as argument.
deciSecondsCode
Code for indicating decimal seconds duration offset.

| Codeword | Value |
|---|---|
| 110 | 0 |
| 100 | 0.1 |
| 101 | 0.2 |
| 0110 | 0.3 |
| 0111 | 0.4 |
| 111 | 0.5 |
| 0100 | 0.6 |
| 0101 | 0.7 |
| 0010 | 0.8 |
| 0011 | 0.9 |
| 000 | 1 |

addMilliseconds
Flag indicating whether milliseconds duration offset is transmitted next.
milliSecondsCode
Code for indicating milliseconds duration offset.

| Codeword | Value |
|---|---|
| 1111010 | 0 |
| 1111011 | 0.001 |
| 1111000 | 0.002 |
| 1111001 | 0.003 |
| 1111110 | 0.004 |
| 1111111 | 0.005 |
| 1111100 | 0.006 |
| 1111101 | 0.007 |
| 1110010 | 0.008 |
| 1110011 | 0.009 |
| 11001 | 0.01 |
| 1110000 | 0.011 |
| 1110001 | 0.012 |
| 1110110 | 0.013 |
| 1110111 | 0.014 |
| 1110100 | 0.015 |
| 1110101 | 0.016 |
| 0101010 | 0.017 |
| 0101011 | 0.018 |
| 0101000 | 0.019 |
| 10010 | 0.02 |
| 0101001 | 0.021 |
| 0101110 | 0.022 |
| 0101111 | 0.023 |
| 0101100 | 0.024 |
| 0101101 | 0.025 |
| 0100010 | 0.026 |
| 0100011 | 0.027 |

-continued

| Codeword | Value |
|---|---|
| 0100000 | 0.028 |
| 0100001 | 0.029 |
| 10011 | 0.03 |
| 0100110 | 0.031 |
| 0100111 | 0.032 |
| 0100100 | 0.033 |
| 0100101 | 0.034 |
| 0111010 | 0.035 |
| 0111011 | 0.036 |
| 0111000 | 0.037 |
| 0111001 | 0.038 |
| 0111110 | 0.039 |
| 10000 | 0.04 |
| 0111111 | 0.041 |
| 0111100 | 0.042 |
| 0111101 | 0.043 |
| 0110010 | 0.044 |
| 0110011 | 0.045 |
| 0110000 | 0.046 |
| 0110001 | 0.047 |
| 0110110 | 0.048 |
| 0110111 | 0.049 |
| 10001 | 0.05 |
| 0110100 | 0.051 |
| 0110101 | 0.052 |
| 0001010 | 0.053 |
| 0001011 | 0.054 |
| 0001000 | 0.055 |
| 0001001 | 0.056 |
| 0001110 | 0.057 |
| 0001111 | 0.058 |
| 0001100 | 0.059 |
| 10110 | 0.06 |
| 0001101 | 0.061 |
| 0000010 | 0.062 |
| 0000011 | 0.063 |
| 0000000 | 0.064 |
| 0000001 | 0.065 |
| 0000110 | 0.066 |
| 0000111 | 0.067 |
| 0000100 | 0.068 |
| 0000101 | 0.069 |
| 10111 | 0.07 |
| 0011010 | 0.071 |
| 0011011 | 0.072 |
| 0011000 | 0.073 |
| 0011001 | 0.074 |
| 0011110 | 0.075 |
| 0011111 | 0.076 |
| 0011100 | 0.077 |
| 0011101 | 0.078 |
| 0010010 | 0.079 |
| 10100 | 0.08 |
| 0010011 | 0.081 |
| 0010000 | 0.082 |
| 0010001 | 0.083 |
| 0010110 | 0.084 |
| 0010111 | 0.085 |
| 0010100 | 0.086 |
| 0010101 | 0.087 |
| 1101010 | 0.088 |
| 1101011 | 0.089 |
| 10101 | 0.09 |
| 1101000 | 0.091 |
| 1101001 | 0.092 |
| 1101110 | 0.093 |
| 1101111 | 0.094 |
| 1101100 | 0.095 |
| 1101101 | 0.096 |
| 1100010 | 0.097 |
| 1100011 | 0.098 |
| 110000 | 0.099 |

addSamples
Flag indicating whether sample-based duration offset is transmitted next.

samplesCode

Code for indicating number of samples duration offset.

| Codeword | Value |
|---|---|
| 11000 | 1 |
| 11001 | 2 |
| 111110 | 3 |
| 111111 | 4 |
| 111100 | 5 |
| 111101 | 6 |
| 10010 | 7 |
| 10011 | 8 |
| 10000 | 9 |
| 10001 | 10 |
| 10110 | 11 |
| 10111 | 12 |
| 10100 | 13 |
| 10101 | 14 |
| 001010 | 15 |
| 001011 | 16 |
| 001000 | 17 |
| 001001 | 18 |
| 001110 | 19 |
| 001111 | 20 |
| 001100 | 21 |
| 001101 | 22 |
| 000010 | 23 |
| 000011 | 24 |
| 000000 | 25 |
| 000001 | 26 |
| 000110 | 27 |
| 000111 | 28 |
| 000100 | 29 |
| 000101 | 30 |
| 011010 | 31 |
| 011011 | 32 |
| 011000 | 33 |
| 011001 | 34 |
| 011110 | 35 |
| 011111 | 36 |
| 011100 | 37 |
| 011101 | 38 |
| 010010 | 39 |
| 010011 | 40 |
| 010000 | 41 |
| 010001 | 42 |
| 010110 | 43 |
| 010111 | 44 |
| 010100 | 45 |
| 010101 | 46 |
| 11010 | 47 |
| 110111010 | 48 |
| 110111011 | 49 |
| 110111000 | 50 |
| 110111001 | 51 |
| 110111110 | 52 |
| 110111111 | 53 |
| 110111100 | 54 |
| 110111101 | 55 |
| 110110010 | 56 |
| 110110011 | 57 |
| 110110000 | 58 |
| 110110001 | 59 |
| 110110110 | 60 |
| 110110111 | 61 |
| 110110100 | 62 |
| 110110101 | 63 |
| 111001010 | 64 |
| 111001011 | 65 |
| 111001000 | 66 |
| 111001001 | 67 |
| 111001110 | 68 |
| 111001111 | 69 |
| 111001100 | 70 |
| 111001101 | 71 |
| 111000010 | 72 |
| 111000011 | 73 |
| 111000000 | 74 |
| 111000001 | 75 |
| 111000110 | 76 |
| 111000111 | 77 |
| 111000100 | 78 |
| 111000101 | 79 |
| 111011010 | 80 |
| 111011011 | 81 |
| 111011000 | 82 |
| 111011001 | 83 |
| 111011110 | 84 |
| 111011111 | 85 |
| 111011100 | 86 |
| 111011101 | 87 |
| 111010010 | 88 |
| 111010011 | 89 |
| 111010000 | 90 |
| 111010001 | 91 |
| 111010110 | 92 |
| 111010111 | 93 |
| 111010100 | 94 |
| 111010101 | 95 |

addSeconds

Flag indicating whether seconds duration offset is transmitted next.

secondsCode

Code for indicating seconds duration offset.

| Codeword | Value |
|---|---|
| 0011 | 1 |
| 0001 | 2 |
| 0000 | 3 |
| 1111 | 4 |
| 1101 | 5 |
| 1100 | 6 |
| 1011 | 7 |
| 1001 | 8 |
| 1000 | 9 |
| 01110 | 10 |
| 01101 | 11 |
| 01100 | 12 |
| 01011 | 13 |
| 01001 | 14 |
| 01000 | 15 |
| 00101 | 16 |
| 11101 | 17 |
| 11100 | 18 |
| 10101 | 19 |
| 011111 | 20 |
| 011110 | 21 |
| 010101 | 22 |
| 001001 | 23 |
| 001000 | 24 |
| 101001 | 25 |
| 0101001 | 26 |
| 0101000 | 27 |
| 1010001 | 28 |
| 10100001 | 29 |
| 10100000 | 30 |

GetFrequency( )

Returns a frequency in Hz from the range [116 . . . 49717].

| Syntax | #bits | Type |
|---|---|---|
| GetFrequency( ) | | |
| { | | |
| frequency = LUT(frequencyCode); | var | vlclbf |
| if (moreAccuracy) | 1 | bslbf |
| { | | |

-continued

```
Syntax                                                        #bits  Type
    frequency = frequency * 2^((frequencyRefine + 1) /        4      uimsbf
51);
  }
}
```

LUT( )
Execute query on look-up table corresponding to the field whose value is provided as argument.
frequencyCode
Code that indicates a center frequency in Hz of a one-third octave band.

| Codeword | Value |
|---|---|
| 100011 | 16 |
| 001110 | 20 |
| 001111 | 25 |
| 1001 | 31.5 |
| 001100 | 40 |
| 001101 | 50 |
| 0000 | 63 |
| 011010 | 80 |
| 011011 | 100 |
| 0001 | 125 |
| 011000 | 160 |
| 011001 | 200 |
| 1110 | 250 |
| 011110 | 315 |
| 011111 | 400 |
| 1111 | 500 |
| 011100 | 630 |
| 011101 | 800 |
| 1100 | 1000 |
| 010010 | 1250 |
| 010011 | 1600 |
| 1101 | 2000 |
| 010000 | 2500 |
| 010001 | 3150 |
| 1010 | 4000 |
| 010110 | 5000 |
| 010111 | 6300 |
| 1011 | 8000 |
| 010100 | 10000 |
| 010101 | 12500 |
| 0010 | 16000 |
| 10000 | 20000 |
| 10001010 | 25000 |
| 10001011 | 31500 |
| 1000100 | 40000 |

moreAccuracy
Flag that indicates whether data for a more accurate frequency is transmitted.
frequencyRefine
Field that indicates a value for refining the frequency value.
GetPosition( )
Returns a position [x, y, z] in meters.

```
Syntax                                                  #bits   Type
position = GetPosition(isSmallScene)
{
  for c = 0:2
  {
    coord = GetDistance(isSmallScene);
    isNegative;                                         1       bslbf
    if (isNegative)
    {
      position [c] = −1 * coord;
    } else
    {
      position [c] = coord;
    }
  }
  return position;
}
```

-continued

GetPositionDelta( )
Returns a position delta [dx, dy, dz] in meters.

```
Syntax                                                  #bits   Type
positionDelta = GetPositionDelta(isSmallScene)
{
  positionDelta = GetPosition(isSmallScene);
< >
  return positionDelta;
}
```

GetDistance( )
Returns a distance in meters.

```
Syntax                                                  #bits   Type
distance = GetDistance(isSmallScene)
{
  meters = LUT(metersCode);                             var     vlclbf
  distance = meters;
  if (isSmallScene == false)
  {
    if (addHectometers)                                 1       bslbf
    {
      hectometers = LUT(hectometersCode);               var     vlclbf
      distance = distance + 100 * hectometers;
      while (addKilometers)                             1       bslbf
      {
        kilometers = LUT(kilometersCode);               var     vlclbf
        distance = distance + kilometers * 1000;
      }
    }
  }
  if (addCentimeters)                                   1       bslbf
  {
    centimeters = LUT(centimetersCode);                 var     vlclbf
    distance = distance + centimeters / 100;
    if (addMillimeters)                                 1       bslbf
    {
      millimeters = LUT(millimetersCode);               var     vlclbf
      distance = distance + millimeters / 1000;
    }
  }
  return distance;
}
```

LUT( )
Executes query on look-up table corresponding to the field whose value is provided as argument.
metersCode
Code for indicating meters coordinate offset.

| Codeword | Value |
|---|---|
| 111101 | 0 |
| 110010 | 1 |
| 110011 | 2 |
| 110000 | 3 |
| 110001 | 4 |
| 110110 | 5 |
| 110111 | 6 |

-continued

| Codeword | Value |
|---|---|
| 110100 | 7 |
| 110101 | 8 |
| 001010 | 9 |
| 001011 | 10 |
| 001000 | 11 |
| 001001 | 12 |
| 001110 | 13 |
| 001111 | 14 |
| 001100 | 15 |
| 001101 | 16 |
| 000010 | 17 |
| 000011 | 18 |
| 000000 | 19 |
| 000001 | 20 |
| 000110 | 21 |
| 000111 | 22 |
| 000100 | 23 |
| 000101 | 24 |
| 011010 | 25 |
| 011011 | 26 |
| 011000 | 27 |
| 011001 | 28 |
| 011110 | 29 |
| 011111 | 30 |
| 011100 | 31 |
| 011101 | 32 |
| 010010 | 33 |
| 010011 | 34 |
| 010000 | 35 |
| 010001 | 36 |
| 010110 | 37 |
| 010111 | 38 |
| 010100 | 39 |
| 010101 | 40 |
| 101010 | 41 |
| 101011 | 42 |
| 101000 | 43 |
| 101001 | 44 |
| 101110 | 45 |
| 101111 | 46 |
| 101100 | 47 |
| 101101 | 48 |
| 10000 | 49 |
| 1000100 | 50 |
| 1000101 | 51 |
| 10001110 | 52 |
| 10001111 | 53 |
| 10001100 | 54 |
| 10001101 | 55 |
| 10011010 | 56 |
| 10011011 | 57 |
| 10011000 | 58 |
| 10011001 | 59 |
| 10011110 | 60 |
| 10011111 | 61 |
| 10011100 | 62 |
| 10011101 | 63 |
| 10010010 | 64 |
| 10010011 | 65 |
| 10010000 | 66 |
| 10010001 | 67 |
| 10010110 | 68 |
| 10010111 | 69 |
| 10010100 | 70 |
| 10010101 | 71 |
| 11101010 | 72 |
| 11101011 | 73 |
| 11101000 | 74 |
| 11101001 | 75 |
| 11101110 | 76 |
| 11101111 | 77 |
| 11101100 | 78 |
| 11101101 | 79 |
| 11100010 | 80 |
| 11100011 | 81 |
| 11100000 | 82 |
| 11100001 | 83 |

-continued

| Codeword | Value |
|---|---|
| 11100110 | 84 |
| 11100111 | 85 |
| 11100100 | 86 |
| 11100101 | 87 |
| 11111010 | 88 |
| 11111011 | 89 |
| 11111000 | 90 |
| 11111001 | 91 |
| 11111110 | 92 |
| 11111111 | 93 |
| 11111100 | 94 |
| 11111101 | 95 |
| 11110010 | 96 |
| 11110011 | 97 |
| 11110000 | 98 |
| 11110001 | 99 |

addHectometers
Flag indicating whether hectometers coordinate offset is transmitted next.
hectometersCode
Code for indicating hectometers coordinate offset.

| Codeword | Value |
|---|---|
| 010 | 1 |
| 011 | 2 |
| 000 | 3 |
| 001 | 4 |
| 110 | 5 |
| 111 | 6 |
| 1010 | 7 |
| 1011 | 8 |
| 100 | 9 |

addKilometers
Flag indicating whether kilometers coordinate offset is transmitted next.
kilometersCode
Code for indicating kilometers coordinate offset. Multiple occurrences can be provided for distances beyond 10 km.

| Codeword | Value |
|---|---|
| 10 | 1 |
| 011 | 2 |
| 001 | 3 |
| 000 | 4 |
| 111 | 5 |
| 0101 | 6 |
| 0100 | 7 |
| 1101 | 8 |
| 11001 | 9 |
| 11000 | 10 |

addCentimeters
Flag indicating whether centimeters coordinate offset is transmitted next.
centimetersCode
Code for indicating centimeters coordinate offset.

| Codeword | Value |
|---|---|
| 110010 | 0 |
| 110011 | 1 |
| 110000 | 2 |
| 110001 | 3 |

-continued

| Codeword | Value |
|---|---|
| 110110 | 4 |
| 110111 | 5 |
| 110100 | 6 |
| 110101 | 7 |
| 0101010 | 8 |
| 0101011 | 9 |
| 0101000 | 10 |
| 0101001 | 11 |
| 0101110 | 12 |
| 0101111 | 13 |
| 0101100 | 14 |
| 0101101 | 15 |
| 0100010 | 16 |
| 0100011 | 17 |
| 0100000 | 18 |
| 0100001 | 19 |
| 0100110 | 20 |
| 0100111 | 21 |
| 0100100 | 22 |
| 0100101 | 23 |
| 0111010 | 24 |
| 0111011 | 25 |
| 0111000 | 26 |
| 0111001 | 27 |
| 0111110 | 28 |
| 0111111 | 29 |
| 0111100 | 30 |
| 0111101 | 31 |
| 0110010 | 32 |
| 0110011 | 33 |
| 0110000 | 34 |
| 0110001 | 35 |
| 0110110 | 36 |
| 0110111 | 37 |
| 0110100 | 38 |
| 0110101 | 39 |
| 0001010 | 40 |
| 0001011 | 41 |
| 0001000 | 42 |
| 0001001 | 43 |
| 0001110 | 44 |
| 0001111 | 45 |
| 0001100 | 46 |
| 0001101 | 47 |
| 0000010 | 48 |
| 0000011 | 49 |
| 0000000 | 50 |
| 0000001 | 51 |
| 0000110 | 52 |
| 0000111 | 53 |
| 0000100 | 54 |
| 0000101 | 55 |
| 0011010 | 56 |
| 0011011 | 57 |
| 0011000 | 58 |
| 0011001 | 59 |
| 0011110 | 60 |
| 0011111 | 61 |
| 0011100 | 62 |
| 0011101 | 63 |
| 0010010 | 64 |
| 0010011 | 65 |
| 0010000 | 66 |
| 0010001 | 67 |
| 0010110 | 68 |
| 0010111 | 69 |
| 0010100 | 70 |
| 0010101 | 71 |
| 101010 | 72 |
| 101011 | 73 |
| 101000 | 74 |
| 101001 | 75 |
| 101110 | 76 |
| 101111 | 77 |
| 101100 | 78 |
| 101101 | 79 |
| 100010 | 80 |

-continued

| Codeword | Value |
|---|---|
| 100011 | 81 |
| 100000 | 82 |
| 100001 | 83 |
| 100110 | 84 |
| 100111 | 85 |
| 100100 | 86 |
| 100101 | 87 |
| 1111010 | 88 |
| 1111011 | 89 |
| 1111000 | 90 |
| 1111001 | 91 |
| 1111110 | 92 |
| 1111111 | 93 |
| 1111100 | 94 |
| 1111101 | 95 |
| 111010 | 96 |
| 111011 | 97 |
| 111000 | 98 |
| 111001 | 99 |

addMillimeters

Flag indicating whether millimeters coordinate offset is transmitted next.

millimetersCode

Code for indicating millimeters coordinate offset.

| Codeword | Value |
|---|---|
| 000 | 0 |
| 001 | 1 |
| 0110 | 2 |
| 0111 | 3 |
| 0100 | 4 |
| 0101 | 5 |
| 110 | 6 |
| 111 | 7 |
| 100 | 8 |
| 101 | 9 |

Representation of Orientation Properties

The acoustic environment data may in many, and indeed most likely in most, scenarios include values for one or more orientation properties.

In some embodiments, this may advantageously be achieved by the acoustic environment data including representations of the orientation values.

In some embodiments, the acoustic environment data comprises a data group/data field that describes an orientation representation format for representing orientation properties. In many embodiments, the acoustic environment data may include data (either in the same or different data sets/points) that describes or defines a plurality of different orientation representation format. Each orientation representation format may provide a (data/bit) format for presenting orientation values. A plurality of data sets/points may then comprise data describing an orientation property by using one of defined the orientation representation formats.

In some embodiments, the acoustic environment data may comprise an indicator for indicating whether the bitstream comprises a data group/data field describing the orientation representation format. For example, a flag may be indicated to indicate that data fields are included which describe an orientation representation format.

Also, flags/indicators may be provided for individual orientation values indicating whether they are provided in accordance with an orientation representation format defined in the acoustic environment data or not. Flags/ indicators may for individual values be included to indicate which of e.g. multiple orientation representation formats are used for the specific value.

The orientation representation formats may for example include one or more of the following:

An indication of a predetermined default orientation representation. A number of default orientation representations may be predetermined (e.g. by a Standards definition). Data may be included to refer to such a default orientation. For example, the field orientationCode may indicate the default orientation.

A set of predetermined angles. An orientation representation format may define a set of predetermined angles, and an orientation value may for example be indicated simply by referencing one of such predetermined angles. For example, each of the predetermined angles may be represented by an index and a given orientation value may be represented by indicating the appropriate index. E.g. each angle of the orientation value may be indicated by a default angle from a small range of angles.

A set of angles e.g. on a quantized grid. The representation of angles may be by an explicit angle value. The angle value may be represented by a given word length and thus have a given quantization level. Thus, each angle of the orientation indicated by one of a larger range of angles.

Some examples of approaches to provide orientation values in accordance with the above examples are provided below.

GetOrientation( )

Returns an orientation [yaw, pitch, roll] in radians.

| Syntax | #bits | Type |
|---|---|---|
| orientation = GetOrientation( ) | | |
| { | | |
| orientation = LUT(orientationCode); | var | vlclbf |
| if (orientationCode == 'Default angles') | | |
| { | | |
| orientation [0] = LUT(defaultYawCode); | var | vlclbf |
| orientation [1] = LUT(defaultPitchCode); | var | vlclbf |
| orientation [2] = LUT(defaultRollCode); | var | vlclbf |
| } elseif (orientationCode == 'Explicit angles') | | |
| { | | |
| for (o = 0:2) | | |
| { | | |
| coarseAngle = LUT(coarseAngleCode); | var | vlclbf |
| angle = coarseAngle; | | |
| if (addFineAngle) | 1 | bslbf |
| { | | |
| fineAngle = LUT(fineAngleCode); | var | vlclbf |
| angle = angle + fineAngle; | | |
| } | | |
| orientation [o] = angle; | | |
| } | | |
| } | | |
| return orientation; | | |
| } | | |

LUT( )

Executes query on look-up table corresponding to the field whose value is provided as argument.

orientationCode

Code for orientation, indicating either a default orientation or one of two escape values for which further data defines the orientation.

| Codeword | Value | Description |
|---|---|---|
| 01 | [0, 0, 0] | Default orientation: (yaw, pitch, roll) |
| 1100 | [0.5 pi, 0, 0] | Default orientation: (yaw, pitch, roll) |
| 1101 | [1.0 pi, 0, 0] | Default orientation: (yaw, pitch, roll) |
| 0010 | [−0.5 pi, 0, 0] | Default orientation: (yaw, pitch, roll) |
| 0011 | [0, 0.5 pi, 0] | Default orientation: (yaw, pitch, roll) |
| 0000 | [0, −0.5 pi, 0] | Default orientation: (yaw, pitch, roll) |
| 0001 | [0, 0, 1.0 pi] | Default orientation: (yaw, pitch, roll) |
| 111 | N/A | Default angles transmitted |
| 10 | N/A | Explicit angles transmitted |

defaultYawCode

Code for a default yaw angle.

| Codeword | Value |
|---|---|
| 010 | −0.75 pi |
| 011 | −0.5 pi |
| 000 | −0.25 pi |
| 001 | 0 |
| 110 | 0.25 pi |
| 111 | 0.5 pi |
| 100 | 0.75 pi |
| 101 | pi |

defaultPitchCode

Code for a default pitch angle.

| Codeword | Value |
|---|---|
| 11 | −0.5 pi |
| 100 | −0.25 pi |
| 00 | 0 |
| 101 | 0.25 pi |
| 01 | 0.5 pi |

defaultRollCode

Code for a default roll angle.

| Codeword | Value |
|---|---|
| 010 | −0.75 pi |
| 011 | −0.5 pi |
| 000 | −0.25 pi |
| 001 | 0 |
| 110 | 0.25 pi |
| 111 | 0.5 pi |
| 100 | 0.75 pi |
| 101 | pi |

coarseAngleCode

Code for a coarse angle indication in steps of 1/36 pi.

| Codeword | Value |
|---|---|
| 010010 | −1 pi |
| 010011 | −0.97222 pi |
| 010000 | −0.94444 pi |
| 010001 | −0.91667 pi |
| 010110 | −0.88889 pi |
| 010111 | −0.86111 pi |
| 010100 | 0.83333 pi |
| 010101 | −0.80556 pi |
| 0111010 | −0.77778 pi |
| 0111011 | −0.75 pi |
| 0111000 | −0.72222 pi |
| 0111001 | −0.69444 pi |
| 0111110 | −0.66667 pi |
| 0111111 | −0.63889 pi |

-continued

| Codeword | Value |
|---|---|
| 0111100 | −0.61111 pi |
| 0111101 | −0.58333 pi |
| 0110010 | −0.55556 pi |
| 0110011 | −0.52778 pi |
| 0110000 | −0.5 pi |
| 0110001 | −0.47222 pi |
| 0110110 | −0.44444 pi |
| 0110111 | −0.41667 pi |
| 0110100 | −0.38889 pi |
| 0110101 | −0.36111 pi |
| 101010 | −0.33333 pi |
| 101011 | −0.30556 pi |
| 101000 | −0.27778 pi |
| 101001 | −0.25 pi |
| 101110 | −0.22222 pi |
| 101111 | −0.19444 pi |
| 101100 | −0.16667 pi |
| 101101 | −0.13889 pi |
| 100010 | −0.11111 pi |
| 100011 | −0.083333 pi |
| 100000 | −0.055556 pi |
| 100001 | −0.027778 pi |
| 100110 | 0 pi |
| 100111 | 0.027778 pi |
| 100100 | 0.055556 pi |
| 100101 | 0.083333 pi |
| 111010 | 0.11111 pi |
| 111011 | 0.13889 pi |
| 111000 | 0.16667 pi |
| 111001 | 0.19444 pi |
| 111110 | 0.22222 pi |
| 111111 | 0.25 pi |
| 111100 | 0.27778 pi |
| 111101 | 0.30556 pi |
| 110010 | 0.33333 pi |
| 110011 | 0.36111 pi |
| 110000 | 0.38889 pi |
| 110001 | 0.41667 pi |
| 110110 | 0.44444 pi |
| 110111 | 0.47222 pi |
| 110100 | 0.5 pi |
| 110101 | 0.52778 pi |
| 001010 | 0.55556 pi |
| 001011 | 0.58333 pi |
| 001000 | 0.61111 pi |
| 001001 | 0.63889 pi |
| 001110 | 0.66667 pi |
| 001111 | 0.69444 pi |
| 001100 | 0.72222 pi |
| 001101 | 0.75 pi |
| 000010 | 0.77778 pi |
| 000011 | 0.80556 pi |
| 000000 | 0.83333 pi |
| 000001 | 0.86111 pi |
| 000110 | 0.88889 pi |
| 000111 | 0.91667 pi |
| 000100 | 0.94444 pi |
| 000101 | 0.97222 pi |

addFineAngle

Flag indicating whether finer granularity angle data is transmitted.

fineAngleCode

Code for a fine angle indication in steps of 1/1800 pi.

| Codeword | Value |
|---|---|
| 11100 | 0.00055556 pi |
| 11101 | 0.0011111 pi |
| 10010 | 0.0016667 pi |
| 10011 | 0.0022222 pi |
| 10000 | 0.0027778 pi |
| 10001 | 0.0033333 pi |
| 10110 | 0.0038889 pi |

-continued

| Codeword | Value |
|---|---|
| 10111 | 0.0044444 pi |
| 10100 | 0.005 pi |
| 10101 | 0.0055556 pi |
| 001010 | 0.0061111 pi |
| 001011 | 0.0066667 pi |
| 001000 | 0.0072222 pi |
| 001001 | 0.0077778 pi |
| 001110 | 0.0083333 pi |
| 001111 | 0.0088889 pi |
| 001100 | 0.0094444 pi |
| 001101 | 0.01 pi |
| 000010 | 0.010556 pi |
| 000011 | 0.011111 pi |
| 000000 | 0.011667 pi |
| 000001 | 0.012222 pi |
| 000110 | 0.012778 pi |
| 000111 | 0.013333 pi |
| 000100 | 0.013889 pi |
| 000101 | 0.014444 pi |
| 011010 | 0.015 pi |
| 011011 | 0.015556 pi |
| 011000 | 0.016111 pi |
| 011001 | 0.016667 pi |
| 011110 | 0.017222 pi |
| 011111 | 0.017778 pi |
| 011100 | 0.018333 pi |
| 011101 | 0.018889 pi |
| 010010 | 0.019444 pi |
| 010011 | 0.02 pi |
| 010000 | 0.020556 pi |
| 010001 | 0.021111 pi |
| 010110 | 0.021667 pi |
| 010111 | 0.022222 pi |
| 010100 | 0.022778 pi |
| 010101 | 0.023333 pi |
| 11010 | 0.023889 pi |
| 11011 | 0.024444 pi |
| 11000 | 0.025 pi |
| 11001 | 0.025556 pi |
| 111110 | 0.026111 pi |
| 111111 | 0.026667 pi |
| 11110 | 0.027222 pi |

GetGain( )

Returns a gain value in dB.

| Syntax | #bits | Type |
|---|---|---|
| gain = GetGain( ) | | |
| { | | |
| gain = LUT(coarseGainCode); | var | vlclbf |
| if (addFineGain) | 1 | bslbf |
| { | | |
| fineGain = LUT(fineGainCode); | var | vlclbf |
| gain = gain + fineGain; | | |
| } | } | |
| return gain; | | |
| } | | |

coarseGainCode

Code for a coarse gain value (in dB).

| Codeword | Value |
|---|---|
| 0110100 | −60 |
| 0110101 | −30 |
| 011110 | −24 |
| 011111 | −18 |
| 01110 | −15 |
| 1100 | −12 |
| 111 | −9 |
| 100 | −6 |

-continued

| Codeword | Value |
|---|---|
| 101 | −3 |
| 00 | 0 |
| 010 | 3 |
| 1101 | 6 |
| 01100 | 9 |
| 01101110 | 12 |
| 01101111 | 15 |
| 0110110 | 24 |

addFineGain
Flag indicating whether further data is transmitted to provide a finer resolution gain value.
fineGainCode
Code for a finer gain resolution (1 dB resolution).

| Codeword | Value |
|---|---|
| 000110 | −29 |
| 000111 | −28 |
| 000100 | −27 |
| 000101 | −26 |
| 010010 | −25 |
| 010011 | −24 |
| 010000 | −23 |
| 010001 | −22 |
| 010110 | −21 |
| 010111 | −20 |
| 010100 | −19 |
| 010101 | −18 |
| 001010 | −17 |
| 001011 | −16 |
| 001000 | −15 |
| 001001 | −14 |
| 001110 | −13 |
| 001111 | −12 |
| 001100 | −11 |
| 001101 | −10 |
| 011010 | −9 |
| 011011 | −8 |
| 011000 | −7 |
| 011001 | −6 |
| 01110 | −5 |
| 01111 | −4 |
| 0000 | −3 |
| 10 | −2 |
| 11 | −1 |

GetGainDelta( )
Returns a gain delta value in dB.

| Syntax | #bits | Type |
|---|---|---|
| gain = GetGainDelta( ) | | |
| { | | |
| gain = GetGain( ); | | |
| return gain; | | |
| } | | |

GetRenderingConditions( )
Contains information on how to render a source.

| Syntax | #bits | Type |
|---|---|---|
| GetRenderingConditions( ) | | |
| { | | |
| if (isNormalConditions == false) | 1 | bslbf |
| { | | |
| doReverb; | 1 | bslbf |
| doEarlyReflections; | 1 | bslbf |

-continued

| Syntax | #bits | Type |
|---|---|---|
| doDoppler; | 1 | bslbf |
| doDistanceAtt; | 1 | bslbf |
| doDirectPath; | 1 | bslbf |
| if (regionDependentActivation) | 1 | bslbf |
| { | | |
| activateRegionID = GetID( ); | | |
| activateGoingIn; | 1 | bslbf |
| } | | |
| if (regionDependentDeactivation) | 1 | bslbf |
| { | | |
| deactivateRegionID = GetID( ); | | |
| deactivateGoingIn; | 1 | bslbf |
| } | | |
| } | | |
| } | | |

isNormalConditions
Flag that indicates whether the rendering conditions are normal. This means no acoustic features are explicitly turned off, and rendering of the source or certain acoustic features of the source are determined by the decoder.
doReverb
Flag that indicates whether to render reverberation for the corresponding source.
doEarlyReflections
Flag that indicates whether to render early reflections for the corresponding source.
doDoppler
Flag that indicates whether to render the Doppler effect for the corresponding source.
doDistanceAtt
Flag that indicates whether to render distance attenuation for the corresponding source.
doDirectPath
Flag that indicates whether to render a direct path for the corresponding source.
regionDependentActivation
Flag that indicates whether further data specifies whether the source should be activated, depending on the user position.
activateGoingIn
Flag that indicates, when true, that the source be activated when the user moves into the specified region.
regionDependentDeactivation
Flag that indicates whether further data specifies whether the source should be deactivated, depending on the user position.
deactivateGoingIn
Flag that indicates, when true, that the source be deactivated when the user moves into the specified region.

In the above the term audio and audio source have been used but it will be appreciated that this is equivalent to the terms sound and sound source. References to the term “audio” can be replaced by references to the term “sound”.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus comprising:

a metadata generator circuit, wherein the metadata generator circuit is arranged to generate metadata for audio data for a plurality of audio elements, wherein each of the plurality of audio elements represent audio sources in an environment, wherein the metadata comprises acoustic environment data for the environment, wherein the acoustic environment data describes a plurality of properties affecting sound propagation for the audio sources in the environment, wherein at least a portion of the acoustic environment data is applicable to a plurality of listening poses in the environment, wherein the plurality of properties affecting sound propagation comprises static properties and dynamic properties; and a bitstream generator circuit, wherein the bitstream generator circuit is arranged to generate a bitstream, wherein the bitstream comprises the metadata;

wherein the acoustic environment data comprises a first data group and at least one second data group, wherein the first data group describes an orientation representation format for representing a plurality of orientation properties, wherein the orientation representation format is selected from the group consisting of an indication of a predetermined default orientation representation, a plurality of predetermined angles, and angles on a quantized grid, wherein the acoustic environment data comprises an indication of the selected orientation representation format, wherein the at least one second data group comprises data describing an orientation property of the plurality of properties affecting sound propagation using the orientation representation format.

2. The apparatus of claim 1, wherein the acoustic environment data comprises a third data group and at least one fourth data group, wherein the third data group describes a frequency grid, wherein the at least one fourth data group comprises data describing a frequency dependent property of the plurality of properties affecting sound propagation using the frequency grid, wherein the bitstream comprises an indicator for indicating whether the bitstream comprises the third data group, wherein the third data group comprises an indication of a format for data describing the frequency grid, wherein the format for the data describing the frequency grid selected from the group consisting of an indication of a predetermined default grid, a start frequency and a frequency range for at least some subranges of the frequency grid and individual frequencies.

3. The apparatus of claim 1, wherein the orientation representation format is selected from the group consisting of an indication of a plurality of predetermined angles and data indicating angles on a quantized grid.

4. The apparatus of claim 1, wherein the metadata generator circuit is arranged to select the plurality of orientation properties based on the orientation representation format from the first group.

5. The apparatus of claim 1, wherein each predetermined angle of the plurality of predetermined angles is represented by an index, and the orientation property is represented by an indication of an index for a predetermined angle.

6. The apparatus of claim 2, wherein the format for data describing the frequency grid comprises a plurality of predetermined angles.

7. The apparatus of claim 2, wherein the format for data describing the frequency grid comprises angles on a quantized grid.

8. The apparatus of claim 1, wherein the acoustic environment data comprises a fifth data group and a sixth data group, wherein the fifth data group describes a fifth orientation representation format, wherein the fifth orientation representation format represents a plurality of orientation properties, wherein the fifth data group comprises data describing an orientation property of the plurality of properties affecting sound propagation using the fifth orientation representation format, wherein the sixth data group comprises data indicating a plurality of predetermined angles.

9. The apparatus of claim 1,
wherein the acoustic environment data comprises a first data field for first bits and a second data field,
wherein the first bits represent a value of a first property of a plurality of properties affecting sound propagation,
wherein each of the plurality of properties affecting sound propagation affect sound propagation,
wherein the second data field comprises an indication of whether the acoustic environment data comprises an extension data field for second bits,
wherein the second bits represent the value of a first property.

10. The apparatus of claim 1,
wherein the metadata generator circuit is arranged to generate the acoustic environment data so as to include a global indicator,
wherein the global indicator indicates that the environment is a spatially constrained environment,
wherein the metadata generator circuit is arranged to generate the acoustic environment data so as to restrict data values of the acoustic environment data to comply with a predetermined restricted format for data values.

11. The apparatus of claim 1,
wherein the acoustic environment data is arranged in consecutive data groups,
wherein each data group comprise data for a time interval,
wherein a first data group of the consecutive data groups comprises a first property value for at least one property of the plurality of properties affecting sound propagation and a time indication for the first property value,
wherein the time indication indicates a time within a time interval represented by the first data group.

12. The apparatus of claim 1,
wherein the acoustic environment data is arranged in consecutive data groups,
wherein each data group of the consecutive data groups comprise data for a time interval,
wherein the bitstream generator circuit is arranged to determine a condition,
wherein if the condition is true if a property value for a first property of the plurality of properties affecting sound propagation is provided for a default time within a time interval represented by a first data group,
wherein the first data group comprises the first property value in the first data group without a time indication if the condition is true,
wherein the first data group the first property value in the first data group with a time indication for the first property value if the condition is not true.

13. The apparatus of claim 1,
wherein the acoustic environment data for a first audio element comprises an indication of a first region of applicability and a second region of applicability for a first property value for a first property of the plurality of properties affecting sound propagation,
wherein the first region of applicability indicates a region for a position of the first audio element for which the first property value applies,
wherein the second region of applicability indicates a region for a listening position for which the first property value applies.

14. An apparatus comprising:
a receiver circuit,
wherein the receiver circuit is arranged to receive audio data for a plurality of audio elements,
wherein the plurality of audio elements represents audio sources in an environment;
wherein the receiver circuit is arranged to receive a bitstream,
wherein the bitstream comprises metadata for the audio data for the plurality of audio elements,
wherein each of the plurality of audio elements represent audio sources in the environment,
wherein the metadata comprises acoustic environment data for the environment,
wherein the acoustic environment data describes a plurality of properties affecting sound propagation for the audio sources in the environment,
wherein at least a portion of the acoustic environment data is applicable to a plurality of listening poses in the environment,
wherein the plurality of properties affecting sound propagation comprises static properties and dynamic properties; and
a renderer circuit,
wherein the renderer circuit is arranged to generate output audio data for the environment in response to the audio data and the acoustic environment data;
wherein the acoustic environment data comprises a first data group and at least one second data group,
wherein the first data group describes an orientation representation format for representing a plurality of orientation properties,
wherein the orientation representation format selected from the group consisting of an indication of a predetermined default orientation representation, a plurality of predetermined angles, and angles on a quantized grid,
wherein the acoustic environment data comprises an indication of the selected orientation representation format,
wherein the at least one second data group comprises data describing an orientation property of the plurality of properties affecting sound propagation using the orientation representation format.

15. A method comprising:
generating, by a metadata generator circuit, metadata for audio data for a plurality of audio elements,
wherein each of the plurality of audio elements represent audio sources in an environment,
wherein the metadata comprises acoustic environment data for the environment,
wherein the acoustic environment data describes a plurality of properties affecting sound propagation for the audio sources in the environment,
wherein at least a portion of the acoustic environment data is applicable to a plurality of listening poses in the environment,
wherein the plurality of properties affecting sound propagation comprises static properties and dynamic properties; and
generating, by a bitstream generator circuit, a bitstream,
wherein the bitstream comprises the metadata,
wherein the acoustic environment data comprises a first data group and at least one second data group,
wherein the first data group describes an orientation representation format for representing a plurality of orientation properties,
wherein the orientation representation format selected from the group consisting of an indication of a predetermined default orientation representation, a plurality of predetermined angles, and angles on a quantized grid, wherein the acoustic environment data comprises an indication of the selected orientation representation format, wherein the at least one second data group comprises data describing an orientation property of the plurality of properties affecting sound propagation using the orientation representation format.

16. A method comprising:

receiving, by a receiver circuit, audio data for a plurality of audio elements representing audio sources in an environment, and a bitstream comprising metadata for the audio data for the plurality of audio elements, wherein the plurality of audio elements represents audio sources in the environment, wherein the metadata comprises an acoustic environment data for the environment, wherein the acoustic environment data describes a plurality of properties affecting sound propagation for the audio sources in the environment, wherein at least a portion of the acoustic environment data is applicable to a plurality of listening poses in the environment, wherein the plurality of properties affecting sound propagation comprises static properties and dynamic properties; and generating, by a rendering circuit, output audio data for the environment in response to the audio data and the acoustic environment data;

wherein the acoustic environment data comprises a first data group and at least one second data group, wherein the first data group describes an orientation representation format, wherein the orientation representation format represents a plurality of orientation properties, wherein the orientation representation format selected from the group consisting of an indication of a predetermined default orientation representation, a plurality of predetermined angles, and angles on a quantized grid, wherein the acoustic environment data comprises an indication of the selected orientation representation format, wherein the at least one second data group comprises data describing an orientation property of the plurality of properties affecting sound propagation using the orientation representation format.

17. An apparatus comprising:

a processor circuit and a memory circuit, wherein the memory is arranged to store instructions for the processor circuit, wherein the processor circuit is arranged to generate metadata for audio data for a plurality of audio elements, wherein each of the plurality of audio elements represent audio sources in an environment, wherein the metadata comprises acoustic environment data for the environment, wherein the acoustic environment data describes a plurality of properties affecting sound propagation for the audio sources in the environment, wherein at least a portion of the acoustic environment data is applicable to a plurality of listening poses in the environment and wherein the plurality of properties affecting sound propagation comprises static properties and dynamic properties, wherein the processor circuit is arranged to generate a bitstream, wherein the bitstream comprises the metadata;

wherein the acoustic environment data comprises a first data group and at least one second data group, wherein the first data group describes an orientation representation format for representing a plurality of orientation properties, wherein the orientation representation format selected from the group consisting of an indication of a predetermined default orientation representation, a plurality of predetermined angles, and angles on a quantized grid, wherein the acoustic environment data comprises an indication of the selected orientation representation format, wherein the at least one second data group comprises data describing an orientation property of the plurality of properties affecting sound propagation using the orientation representation format.

* * * * *